(12) United States Patent
Yu et al.

(10) Patent No.: US 12,232,201 B2
(45) Date of Patent: Feb. 18, 2025

(54) SEMI-DYNAMIC CONFIGURATION FOR MOBILE SYSTEM

(71) Applicant: Telefonaktiebolaget LM Ericsson (publ), Stockholm (SE)

(72) Inventors: Dongsheng Yu, Ottawa (CA); Hatem Abou-Zeid, Kanata (CA); Haomin Li, Kanata (CA); Gunnar Bergquist, Kista (SE); Ulf Händel, Norsholm (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 394 days.

(21) Appl. No.: 17/763,322

(22) PCT Filed: Sep. 24, 2020

(86) PCT No.: PCT/IB2020/058937
§ 371 (c)(1),
(2) Date: Mar. 24, 2022

(87) PCT Pub. No.: WO2021/059184
PCT Pub. Date: Apr. 1, 2021

(65) Prior Publication Data
US 2022/0338293 A1  Oct. 20, 2022

Related U.S. Application Data

(60) Provisional application No. 62/906,885, filed on Sep. 27, 2019.

(51) Int. Cl.
*H04W 76/20* (2018.01)
*H04L 27/26* (2006.01)
(Continued)

(52) U.S. Cl.
CPC ....... *H04W 76/20* (2018.02); *H04L 27/26025* (2021.01); *H04L 27/2605* (2013.01);
(Continued)

(58) Field of Classification Search
CPC ..... H04W 76/20; H04W 48/12; H04W 72/23; H04W 72/044; H04L 27/2605; H04L 27/26025
See application file for complete search history.

(56) References Cited

U.S. PATENT DOCUMENTS

2019/0074929 A1* 3/2019 Aiba .................. H04L 1/0025

OTHER PUBLICATIONS

International Search Report and Written Opinion dated Dec. 14, 2020 issued in PCT Application No. PCT/IB2020/058937, consisting of 18 pages.
(Continued)

*Primary Examiner* — Anez C Ebrahim
(74) *Attorney, Agent, or Firm* — Weisberg I.P. Law, P.A.

(57) ABSTRACT

Apparatuses and methods for semi-dynamic configuration for mobile systems are disclosed. In some embodiments, a wireless device is configured to receive (S140) a first radio resource control, RRC, configuration profile associated with a cell, the first RRC configuration profile including a plurality of first RRC configuration parameters; and a second RRC configuration profile associated with the cell, the second RRC configuration profile including a plurality of second RRC configuration parameters; and responsive (S142) to at least one of receiving an RRC profile indicator comprised in a downlink control information, DCI, and a timer expiring, switch from communicating in the cell according to the first RRC configuration profile to communicating in the cell according to the second RRC configuration profile, the RRC profile indicator directly indicating the second RRC configuration profile.

14 Claims, 15 Drawing Sheets

(51) Int. Cl.
*H04W 72/044* (2023.01)
*H04W 72/23* (2023.01)
*H04W 36/00* (2009.01)

(52) U.S. Cl.
CPC ......... *H04W 72/044* (2013.01); *H04W 72/23* (2023.01); *H04W 36/0072* (2013.01)

(56) References Cited

OTHER PUBLICATIONS

3GPP TSG-RAN WG4 Meeting #92; R4-1909036; Title: Work Plan for R16 BWP Switch RRM; Source: Huawei, HiSilicon; Agenda Item: 9.1.4.1; Document for: Discussion; Ljubljana, Slovenia, Aug. 26-30, 2019, consisting of 4 pages.
3GPP TSG-RAN WG1 Meeting #90 R1-1713204; Title: Further Remaining Details on Wider Bandwidth Operation; Source: LG Electronics; Agenda Item: 6.1.5; Document for: Discussion and Decision; Prague, Czech Republic, Aug. 21-25, 2017, consisting of 8 pages.
3GPP TSG-RAN WG2 Meeting #107; R2-1909013; Title: Efficient RRC Configuration With Low Latency; WID/SID: LTE_NR_DC_CA_enh-Core—Release 16; Source: Nokia, Nokia Shanghai Bell; Agenda Item: 11.10.4.4; Document for: Discussion and Decision; Prague, Czech Republic; Aug. 26-30, 2019, consisting of 4 pages.
3GPP TSG-RAN WG1 Meeting #97; R1-1906856; Title: Issues Related to PDCCH-Based Power Saving Channel; Source: Sony; Agenda Item: 7.2.9.1; Document for: Discussion/Decision; Reno, USA, May 13-17, 2019, consisting of 12 pages.

* cited by examiner

SEMI-DYNAMIC CONFIGURATION FOR MOBILE SYSTEM

CROSS-REFERENCE TO RELATED APPLICATIONS

This application is a Submission Under 35 U.S.C. § 371 for U.S. National Stage Patent Application of International Application No.: PCT/IB2020/058937, filed Sep. 24, 2020 entitled "SEMI-DYNAMIC CONFIGURATION FOR MOBILE SYSTEM," which claims priority to U.S. Provisional Application No. 62/906,885, filed Sep. 27, 2019, entitled "SEMI-DYNAMIC CONFIGURATION FOR MOBILE SYSTEM," the entireties of both of which are incorporated herein by reference.

TECHNICAL FIELD

The present disclosure relates to wireless communication and in particular, to semi-dynamic configuration for mobile system.

BACKGROUND

Extended scale of spectrum utilization, by frequency range, spectrum allowance and operating bandwidth, has been one of the main features $3^{rd}$ Generation Partnership Project (3GPP) Fifth Generation (5G), also called New Radio (NR) has introduced and will be further explored in future generation. This is the key to cope with increased data rate and capacity demand for different use cases targeted by designing the new generation of mobile radio system. Three main types of use cases are identified for 5G: mobile broadband (MBB), massive machine type communication (mMTC) and low latency high reliability communication (URLLC). The requirements of these use cases can be very different and 5G NR is designed with in a highly flexible way so as to meet these requirements with necessary network configurations and variety of device capabilities.

There are increasing amount of challenges of designing the wireless system, including improved efficient spectrum usage. On one hand, more spectrum is preferred for transmitting more data traffic in the network with high spectrum efficiency. On the other hand, large amount of data traffic may not be transmitted all the time and to all the wireless devices (WDs, also called user equipments or UEs)/devices. For WDs/devices only for small data traffic transmission, or in the time period with minimal or no data traffic, there is no need of the full spectrum resource. It might be preferred that the mount of spectrum resource can adapted to the need of these WDs/devices.

One of the main design features in 5G NR is the introduction of bandwidth parts (BWP). BWP is introduced mainly for device with bandwidth capability smaller than network operating bandwidth and bandwidth adaptation. A BWP is characterized by radio frequency (RF) parameters of bandwidth, location in frequency domain, numerology and length of cyclic prefix. Other than RF aspects of BWP, almost all radio resource control (RRC) configurations (e.g., physical channels and signals) are associated to a particular BWP for a WD. A WD can be configured with multiple BWPs with the same or different numerologies (e.g., 4 DL BWPs and 4 UL BWPs in 3GPP Release-15), and can operate on one or multiple active BWPs (one active BWP in Release-15). For BWP operation, several mechanisms are introduced including downlink control information (DCI) based BWP switch, timer-based BWP switch and RRC based BWP switch. There currently exist certain challenge(s).

Much increased flexibility of 5G NR system has put the challenges on the balanced design of semi-static configurations (e.g., RRC configurations/reconfigurations) and dynamic control information (DCI) for DL and UL transmission. On the one hand, Layer 3 RRC configuration provides more types and instantiations of for each physical channels and signals for radio resource management under different application scenario. On the other hand, the payload of physical layer control information has to be kept at a reasonably small size considering the limited physical resource for control channel in each scheduling period (e.g., a slot) and higher reliability requirement of transmission.

This leads to an increased RRC reconfiguration payload and processing overhead if adaptive configurations are made by the network to leverage the full flexibility of NR.

In certain cases, RRC reconfiguration for a specific WD is used so as to adapt transmission and reception conditions to the changing RF environment or other network needs if such change cannot be done through DCI dynamically. In addition to the overhead, the cost of RRC reconfiguration is the large latency (around 10-80 milliseconds (ms)) required for a WD to receive and process RRC messages. For the fast-changing RF environment, the delay may cause unexpected system performance and capacity degradation.

Some examples of network configurations which can only be changed through RRC reconfiguration:

Uplink waveforms—NR WD supports both Cyclic Prefix-Orthogonal frequency Division Multiplexing (CP-OFDM) and Discrete Fourier Transform spread OFDM (DFT-S-OFDM) as mandatory WD capability. DFT-S-OFDM is implemented for lower cubic metric so as to obtain a higher power-amplifier efficiency especially at cell edge. Switch between CP-OFDM and DFT-S-OFDM may be done by RRC reconfiguration in the current NR specification.

Quadrature Amplitude Modulation (QAM) tables—There are three QAM tables defined in the current NR specification, Table 1 for max of 64QAM, Table 2 for max of 256QAM and Table 3 for URLLC. These tables are semi-statically configured by RRC configuration, and any change must generally be done by RRC reconfiguration.

The periodicity of periodic SRS configuration can only be changed using an RRC reconfiguration message. De-allocating/allocating periodic SRS resources from a WD also requires RRC reconfiguration. It is generally beneficial to change the allocation periodicity dynamically based on WD context (mobility, traffic, etc.). However, the RRC delay can reduce the gains significantly since the WD context may change by the time the RRC message is processed.

SUMMARY

According to an aspect of the present disclosure, a method implemented in a wireless device configured to communicate with a network node is provided. The method includes receiving: a first radio resource control, RRC, configuration profile associated with a cell, the first RRC configuration profile including a plurality of first RRC configuration parameters; and a second RRC configuration profile associated with the cell, the second RRC configuration profile including a plurality of second RRC configuration parameters; and responsive to at least one of receiving an RRC profile indicator comprised in a downlink control information, DCI, and a timer expiring, switching from communicating in the cell according to the first RRC configuration profile to communicating in the cell according to the second RRC configuration profile, the RRC profile indicator directly indicating the second RRC configuration profile.

In some embodiments of this aspect, the RRC profile indicator is comprised in at least one field in the DCI, and a value of the RRC profile indicator maps to one of a plurality of pre-configured RRC configuration profiles. In some embodiments of this aspect, the first and second RRC configuration profiles are grouped into a first RRC configuration profile group, and each RRC configuration profile in the first RRC configuration profile group shares a set of common RRC configuration parameter values. In some embodiments of this aspect, the set of common RRC configuration parameter values shared by each RRC configuration profile in the first RRC configuration profile group includes at least one same radio processing chain parameter value, the at least one same radio processing chain parameter value includes at least one of a same bandwidth, a same frequency location, a same numerology, a same subcarrier spacing and a same cyclic prefix length.

In some embodiments of this aspect, the method further includes using a radio processing chain that is tuned to communicate in the cell according to the first RRC configuration profile; and switching comprises switching from communicating in the cell according to the first RRC configuration profile to communicating in the cell according to the second RRC configuration profile without re-tuning the radio processing chain. In some embodiments of this aspect, the first RRC configuration profile is grouped into a first RRC configuration profile group with at least one other RRC configuration profile, and the second RRC configuration profile is grouped into a second RRC configuration profile group with at least one other RRC configuration profile; each RRC configuration profile in the first RRC configuration profile group share a first set of common RRC configuration parameter values; and each RRC configuration profile in the second RRC configuration profile group share a second set of common RRC configuration parameter values, the first set of common RRC configuration parameter values being different from the second set of common RRC configuration parameter values.

In some embodiments of this aspect, each of the first and second set of common RRC configuration parameter values includes at least one same radio processing chain parameter value, the at least one same radio processing chain parameter value includes at least one of a same bandwidth, a same frequency location, a same numerology, a same subcarrier spacing and a same cyclic prefix length as each of the at least one other RRC configuration profile in the respective first and second RRC configuration profile group. In some embodiments of this aspect, the method further includes using a radio processing chain that is tuned to communicate in the cell according to the first RRC configuration profile; and switching comprises responsive to the at least one of the receiving the RRC profile indicator comprised in the DCI and the timer expiring re-tuning the radio processing chain according to the second RRC configuration profile when the second RRC configuration profile and the first RRC configuration profile belong to different RRC configuration profile groups; and switching from communicating in the cell according to the first RRC configuration profile to communicating in the cell according to the second RRC configuration profile without re-tuning the radio processing chain when the second RRC configuration profile and the first RRC configuration profile belong to a same RRC configuration profile group.

In some embodiments of this aspect, switching comprises responsive to receiving the RRC profile indicator comprised in the DCI, switching from communicating in the cell according to a first uplink waveform indicated in the first RRC configuration profile to communicating in the cell according to a second uplink waveform indicated in the second RRC configuration profile, the second uplink waveform being different from the first uplink waveform. In some embodiments of this aspect, the first uplink waveform is a cyclic prefix orthogonal frequency division multiplexing, CP-OFDM, waveform and the second uplink waveform is a discrete Fourier Transform spread orthogonal frequency division multiplexing, DFT-S-OFDM, waveform. In some embodiments of this aspect, switching comprises responsive to receiving the RRC profile indicator comprised in the DCI, switching from communicating in the cell according to a first quadrature amplitude modulation, QAM, table indicated in the first RRC configuration profile to communicating in the cell according to a second QAM table indicated in the second RRC configuration profile, the second QAM table being different from the first QAM table.

In some embodiments of this aspect, switching comprises responsive to receiving the RRC profile indicator comprised in the DCI, switching from communicating in the cell according to a first periodicity for at least one periodic resource indicated in the first RRC configuration profile to communicating in the cell according to a second periodicity for the at least one periodic resource indicated in the second RRC configuration profile, the second periodicity being different from the first periodicity. In some embodiments of this aspect, the at least one periodic resource includes at least one periodic sounding reference signal, SRS, resource.

In some embodiments of this aspect, the first RRC configuration profile is associated with a first bandwidth part, BWP, and the second RRC configuration profile is associated with a second BWP; and switching comprises, responsive to the at least one of the receiving the RRC profile indicator comprised in the DCI and the timer expiring, switching communicating in the cell on the first BWP according to the first RRC configuration profile to communicating in the cell on the second BWP according to the second RRC configuration profile.

In some embodiments of this aspect, at least one of: the first and second RRC configuration profiles are received via RRC signaling; each of the plurality of first and second RRC configuration parameters configures at least one of a physical channel, a physical signal and a bandwidth part for the wireless device, WD; and each of the first and second RRC configuration profiles is associated with a corresponding pre-determined WD characteristic, the WD characteristic including at least one of a location of the WD relative to a center of the cell, a power characteristic of the WD, a radio environment of the WD, a number of multiple-input multiple-output, MIMO, layers being used by the WD, a speed of the WD and a latency requirement for the WD.

According to another aspect of the present disclosure, a method implemented in a network node configured to communicate with a wireless device is provided. The method includes sending to the wireless device: a first radio resource control, RRC, configuration profile associated with a cell, the first RRC configuration profile including a plurality of first RRC configuration parameters; and a second RRC configuration profile associated with the cell, the second RRC configuration profile including a plurality of second RRC configuration parameters; optionally, sending an RRC profile indicator comprised in a downlink control information, DCI; and as a result of at least one of the RRC profile indicator comprised in the DCI and a timer expiring for the wireless device, switching from communicating in the cell with the wireless device according to the first RRC configuration profile to communicating in the cell with the wireless device according to the second RRC configuration profile, the RRC profile indicator directly indicating the second RRC configuration profile.

In some embodiments of this aspect, the RRC profile indicator is comprised in at least one field in the DCI, and a value of the RRC profile indicator maps to one of a plurality of pre-configured RRC configuration profiles. In some embodiments of this aspect, the first and second RRC configuration profiles are grouped into a first RRC configuration profile group, and each RRC configuration profile in the first RRC configuration profile group shares a set of common RRC configuration parameter values. In some embodiments of this aspect, the set of common RRC configuration parameter values shared by each RRC configuration profile in the first RRC configuration profile group includes at least one same radio processing chain parameter value, the at least one same radio processing chain parameter value includes at least one of a same bandwidth, a same frequency location, a same numerology, a same subcarrier spacing and a same cyclic prefix length.

In some embodiments of this aspect, the method further includes using a radio processing chain that is tuned to communicate in the cell according to the first RRC configuration profile; and switching comprises switching from communicating in the cell according to the first RRC configuration profile to communicating in the cell according to the second RRC configuration profile without re-tuning the radio processing chain. In some embodiments of this aspect, the first RRC configuration profile is grouped into a first RRC configuration profile group with at least one other RRC configuration profile, and the second RRC configuration profile is grouped into a second RRC configuration profile group with at least one other RRC configuration profile; each RRC configuration profile in the first RRC configuration profile group share a first set of common RRC configuration parameter values; and each RRC configuration profile in the second RRC configuration profile group share a second set of common RRC configuration parameter values, the first set of common RRC configuration parameter values being different from the second set of common RRC configuration parameter values.

In some embodiments of this aspect, each of the first and second set of common RRC configuration parameter values includes at least one same radio processing chain parameter value, the at least one same radio processing chain parameter value includes at least one of a same bandwidth, a same frequency location, a same numerology, a same subcarrier spacing and a same cyclic prefix length as each of the at least one other RRC configuration profile in the respective first and second RRC configuration profile group.

In some embodiments of this aspect, the method further includes using a radio processing chain that is tuned to communicate in the cell according to the first RRC configuration profile; and switching comprises: as a result of at least one of the RRC profile indicator comprised in the DCI and a timer expiring for the wireless device; re-tuning the radio processing chain according to the second RRC configuration profile when the second RRC configuration profile and the first RRC configuration profile belong to different RRC configuration profile groups; and switching from communicating in the cell according to the first RRC configuration profile to communicating in the cell according to the second RRC configuration profile without re-tuning the radio processing chain when the second RRC configuration profile and the first RRC configuration profile belong to a same RRC configuration profile group.

In some embodiments of this aspect, switching comprises as a result of the RRC profile indicator comprised in the DCI, switching from communicating in the cell according to a first uplink waveform indicated in the first RRC configuration profile to communicating in the cell according to a second uplink waveform indicated in the second RRC configuration profile, the second uplink waveform being different from the first uplink waveform. In some embodiments of this aspect, the first uplink waveform is a cyclic prefix orthogonal frequency division multiplexing, CP-OFDM, waveform and the second uplink waveform is a discrete Fourier Transform spread orthogonal frequency division multiplexing, DFT-S-OFDM, waveform.

In some embodiments of this aspect, switching comprises as a result of the RRC profile indicator comprised in the DCI, switching from communicating in the cell according to a first quadrature amplitude modulation, QAM, table indicated in the first RRC configuration profile to communicating in the cell according to a second QAM table indicated in the second RRC configuration profile, the second QAM table being different from the first QAM table. In some embodiments of this aspect, switching comprises as a result of the RRC profile indicator comprised in the DCI, switching from communicating in the cell according to a first periodicity for at least one periodic resource indicated in the first RRC configuration profile to communicating in the cell according to a second periodicity for the at least one periodic resource indicated in the second RRC configuration profile, the second periodicity being different from the first periodicity.

In some embodiments of this aspect, the at least one periodic resource includes at least one periodic sounding reference signal, SRS, resource. In some embodiments of this aspect, the first RRC configuration profile is associated with a first bandwidth part, BWP, and the second RRC configuration profile is associated with a second BWP; and switching comprises, as a result of the at least one of the RRC profile indicator comprised in the DCI and the timer expiring, switching communicating in the cell on the first BWP according to the first RRC configuration profile to communicating in the cell on the second BWP according to the second RRC configuration profile.

In some embodiments of this aspect, at least one of: sending the first and second RRC configuration profiles via RRC signaling; each of the plurality of first and second RRC configuration parameters configures at least one of a physical channel, a physical signal and a bandwidth part for the wireless device, WD; and each of the first and second RRC configuration profiles is associated with a corresponding pre-determined WD characteristic, the WD characteristic including at least one of a location of the WD relative to a center of the cell, a power characteristic of the WD, a radio environment of the WD, a number of multiple-input multiple-output, MIMO, layers being used by the WD, a speed of the WD and a latency requirement for the WD.

According to another aspect of the present disclosure, a wireless device configured to communicate with a network node is provided. The wireless device includes processing circuitry. The processing circuitry is configured to cause the wireless device to receive: a first radio resource control, RRC, configuration profile associated with a cell, the first RRC configuration profile including a plurality of first RRC configuration parameters; and a second RRC configuration profile associated with the cell, the second RRC configuration profile including a plurality of second RRC configuration parameters; and responsive to at least one of receiving an RRC profile indicator comprised in a downlink control information, DCI, and a timer expiring, switch from communicating in the cell according to the first RRC configuration profile to communicating in the cell according to the second RRC configuration profile, the RRC profile indicator directly indicating the second RRC configuration profile.

In some embodiments of this aspect, the RRC profile indicator is comprised in at least one field in the DCI, and a value of the RRC profile indicator maps to one of a plurality of pre-configured RRC configuration profiles. In some embodiments of this aspect, the first and second RRC configuration profiles are grouped into a first RRC configuration profile group, and each RRC configuration profile in the first RRC configuration profile group share a set of common RRC configuration parameter values. In some embodiments of this aspect, the set of common RRC configuration parameter values shared by each RRC configuration profile in the first RRC configuration profile group includes at least one same radio processing chain parameter value, the at least one same radio processing chain parameter value includes at least one of a same bandwidth, a same frequency location, a same numerology, a same subcarrier spacing and a same cyclic prefix length.

In some embodiments of this aspect, the processing circuitry is further configured to cause the wireless device to use a radio processing chain that is tuned to communicate in the cell according to the first RRC configuration profile; and switch by being configured to cause the wireless device to switch from communicating in the cell according to the first RRC configuration profile to communicating in the cell according to the second RRC configuration profile without re-tuning the radio processing chain. In some embodiments of this aspect, the first RRC configuration profile is grouped into a first RRC configuration profile group with at least one other RRC configuration profile and the second RRC configuration profile is grouped into a second RRC configuration profile group with at least one other RRC configuration profile; each RRC configuration profile in the first RRC configuration profile group share a first set of common RRC configuration parameter values; and each RRC configuration profile in the second RRC configuration profile group share a second set of common RRC configuration parameter values, the first set of common RRC configuration parameter values being different from the second set of common RRC configuration parameter values.

In some embodiments of this aspect, each of the first and second set of common RRC configuration parameter values includes at least one same radio processing chain parameter value, the at least one same radio processing chain parameter value includes at least one of a same bandwidth, a same frequency location, a same numerology, a same subcarrier spacing and a same cyclic prefix length as each of the at least one other RRC configuration profile in the respective first and second RRC configuration profile group.

In some embodiments of this aspect, the processing circuitry is further configured to cause the wireless device to use a radio processing chain that is tuned to communicate in the cell according to the first RRC configuration profile; and switch by being configured to cause the wireless device to: responsive to the at least one of the receiving the RRC profile indicator comprised in the DCI and the timer expiring; re-tune the radio processing chain according to the second RRC configuration profile when the second RRC configuration profile and the first RRC configuration profile belong to different RRC configuration profile groups; and switch from communicating in the cell according to the first RRC configuration profile to communicating in the cell according to the second RRC configuration profile without re-tuning the radio processing chain when the second RRC configuration profile and the first RRC configuration profile belong to a same RRC configuration profile group.

In some embodiments of this aspect, the processing circuitry is configured to cause the wireless device to switch by being configured to cause the wireless device to responsive to receiving the RRC profile indicator comprised in the DCI, switch from communicating in the cell according to a first uplink waveform indicated in the first RRC configuration profile to communicating in the cell according to a second uplink waveform indicated in the second RRC configuration profile, the second uplink waveform being different from the first uplink waveform. In some embodiments of this aspect, the first uplink waveform is a cyclic prefix orthogonal frequency division multiplexing, CP-OFDM, waveform and the second uplink waveform is a discrete Fourier Transform spread orthogonal frequency division multiplexing, DFT-S-OFDM, waveform.

In some embodiments of this aspect, the processing circuitry is configured to cause the wireless device to switch by being configured to cause the wireless device to responsive to receiving the RRC profile indicator comprised in the DCI, switch from communicating in the cell according to a first quadrature amplitude modulation, QAM, table indicated in the first RRC configuration profile to communicating in the cell according to a second QAM table indicated in the second RRC configuration profile, the second QAM table being different from the first QAM table.

In some embodiments of this aspect, the processing circuitry is configured to cause the wireless device to switch by being configured to cause the wireless device to responsive to receiving the RRC profile indicator comprised in the DCI, switch from communicating in the cell according to a first periodicity for at least one periodic resource indicated in the first RRC configuration profile to communicating in the cell according to a second periodicity for the at least one periodic resource indicated in the second RRC configuration profile, the second periodicity being different from the first periodicity.

In some embodiments of this aspect, the at least one periodic resource includes at least one periodic sounding reference signal, SRS, resource. In some embodiments of this aspect, the first RRC configuration profile is associated with a first bandwidth part, BWP, and the second RRC configuration profile is associated with a second BWP; and the processing circuitry is configured to cause the wireless device to switch by being configured to cause the wireless device to responsive to the at least one of the receiving the RRC profile indicator comprised in the DCI and the timer expiring, switch communicating in the cell on the first BWP according to the first RRC configuration profile to communicating in the cell on the second BWP according to the second RRC configuration profile.

In some embodiments of this aspect, at least one of: the first and second RRC configuration profiles are received via RRC signaling; each of the plurality of first and second RRC configuration parameters configures at least one of a physical channel, a physical signal and a bandwidth part for the wireless device, WD; and each of the first and second RRC configuration profiles is associated with a corresponding pre-determined WD characteristic, the WD characteristic including at least one of a location of the WD relative to a center of the cell, a power characteristic of the WD, a radio environment of the WD, a number of multiple-input multiple-output, MIMO, layers being used by the WD, a speed of the WD and a latency requirement for the WD.

According to yet another aspect of the present disclosure, a network node configured to communicate with a wireless device is provided. The network node includes processing circuitry. The processing circuitry is configured to cause the network node to send to the wireless device: a first radio resource control, RRC, configuration profile associated with a cell, the first RRC configuration profile including a plurality of first RRC configuration parameters; and a second RRC configuration profile associated with the cell, the second RRC configuration profile including a plurality of second RRC configuration parameters; optionally, send an RRC profile indicator comprised in a downlink control information, DCI; and as a result of at least one of the RRC profile indicator comprised in the DCI and a timer expiring for the wireless device, switch from communicating in the cell with the wireless device according to the first RRC configuration profile to communicating in the cell with the wireless device according to the second RRC configuration profile, the RRC profile indicator directly indicating the second RRC configuration profile.

In some embodiments of this aspect, the RRC profile indicator is comprised in at least one field in the DCI, and a value of the RRC profile indicator maps to one of a plurality of pre-configured RRC configuration profiles. In some embodiments of this aspect, the first and second RRC configuration profiles are grouped into a first RRC configuration profile group, and each RRC configuration profile in the first RRC configuration profile group share a set of common RRC configuration parameter values. In some embodiments of this aspect, the set of common RRC configuration parameter values shared by each RRC configuration profile in the first RRC configuration profile group includes at least one same radio processing chain parameter value, the at least one same radio processing chain parameter value includes at least one of a same bandwidth, a same frequency location, a same numerology, a same subcarrier spacing and a same cyclic prefix length.

In some embodiments of this aspect, the processing circuitry is further configured to cause the network node to use a radio processing chain that is tuned to communicate in the cell according to the first RRC configuration profile; and switch by being configured to cause the network node to switch from communicating in the cell according to the first RRC configuration profile to communicating in the cell according to the second RRC configuration profile without re-tuning the radio processing chain.

In some embodiments of this aspect, the first RRC configuration profile is grouped into a first RRC configuration profile group with at least one other RRC configuration profile and the second RRC configuration profile is grouped into a second RRC configuration profile group with at least one other RRC configuration profile; each RRC configuration profile in the first RRC configuration profile group share a first set of common RRC configuration parameter values; and each RRC configuration profile in the second RRC configuration profile group share a second set of common RRC configuration parameter values, the first set of common RRC configuration parameter values being different from the second set of common RRC configuration parameter values.

In some embodiments of this aspect, each of the first and second set of common RRC configuration parameter values includes at least one same radio processing chain parameter value, the at least one same radio processing chain parameter value includes at least one of a same bandwidth, a same frequency location, a same numerology, a same subcarrier spacing and a same cyclic prefix length as each of the at least one other RRC configuration profile in the respective first and second RRC configuration profile group.

In some embodiments of this aspect, the processing circuitry is further configured to cause the network node to: use a radio processing chain that is tuned to communicate in the cell according to the first RRC configuration profile; and switch by being configured to cause the network node to: as a result of at least one of the RRC profile indicator comprised in the DCI and a timer expiring for the wireless device; re-tune the radio processing chain according to the second RRC configuration profile when the second RRC configuration profile and the first RRC configuration profile belong to different RRC configuration profile groups; and switch from communicating in the cell according to the first RRC configuration profile to communicating in the cell according to the second RRC configuration profile without re-tuning the radio processing chain when the second RRC configuration profile and the first RRC configuration profile belong to a same RRC configuration profile group.

In some embodiments of this aspect, the processing circuitry is configured to cause the network node to switch by being configured to cause the network node to as a result of the RRC profile indicator comprised in the DCI, switch from communicating in the cell according to a first uplink waveform indicated in the first RRC configuration profile to communicating in the cell according to a second uplink waveform indicated in the second RRC configuration profile, the second uplink waveform being different from the first uplink waveform. In some embodiments of this aspect, the first uplink waveform is a cyclic prefix orthogonal frequency division multiplexing, CP-OFDM, waveform and the second uplink waveform is a discrete Fourier Transform spread orthogonal frequency division multiplexing, DFT-S-OFDM, waveform.

In some embodiments of this aspect, the processing circuitry is configured to cause the network node to switch by being configured to cause the network node to as a result of the RRC profile indicator comprised in the DCI, switch from communicating in the cell according to a first quadrature amplitude modulation, QAM, table indicated in the first RRC configuration profile to communicating in the cell according to a second QAM table indicated in the second RRC configuration profile, the second QAM table being different from the first QAM table.

In some embodiments of this aspect, the processing circuitry is configured to cause the network node to switch by being configured to cause the network node to as a result of the RRC profile indicator comprised in the DCI, switch from communicating in the cell according to a first periodicity for at least one periodic resource indicated in the first RRC configuration profile to communicating in the cell according to a second periodicity for the at least one periodic resource indicated in the second RRC configuration profile, the second periodicity being different from the first periodicity.

In some embodiments of this aspect, the at least one periodic resource includes at least one periodic sounding reference signal, SRS, resource. In some embodiments of this aspect, the first RRC configuration profile is associated with a first bandwidth part, BWP, and the second RRC configuration profile is associated with a second BWP; and the processing circuitry is configured to cause the network node to switch by being configured to cause the network node to as a result of the at least one of the RRC profile indicator comprised in the DCI and the timer expiring, switch communicating in the cell on the first BWP according to the first RRC configuration profile to communicating in the cell on the second BWP according to the second RRC configuration profile.

In some embodiments of this aspect, at least one of: the processing circuitry is configured to send the first and second RRC configuration profiles via RRC signaling; each of the plurality of first and second RRC configuration parameters configures at least one of a physical channel, a physical signal and a bandwidth part for the wireless device, WD; and each of the first and second RRC configuration profiles is associated with a corresponding pre-determined WD characteristic, the WD characteristic including at least one of a location of the WD relative to a center of the cell, a power characteristic of the WD, a radio environment of the WD, a number of multiple-input multiple-output, MIMO, layers being used by the WD, a speed of the WD and a latency requirement for the WD.

BRIEF DESCRIPTION OF THE DRAWINGS

A more complete understanding of the present embodiments, and the attendant advantages and features thereof, will be more readily understood by reference to the following detailed description when considered in conjunction with the accompanying drawings wherein.

DETAILED DESCRIPTION

Figure 1:
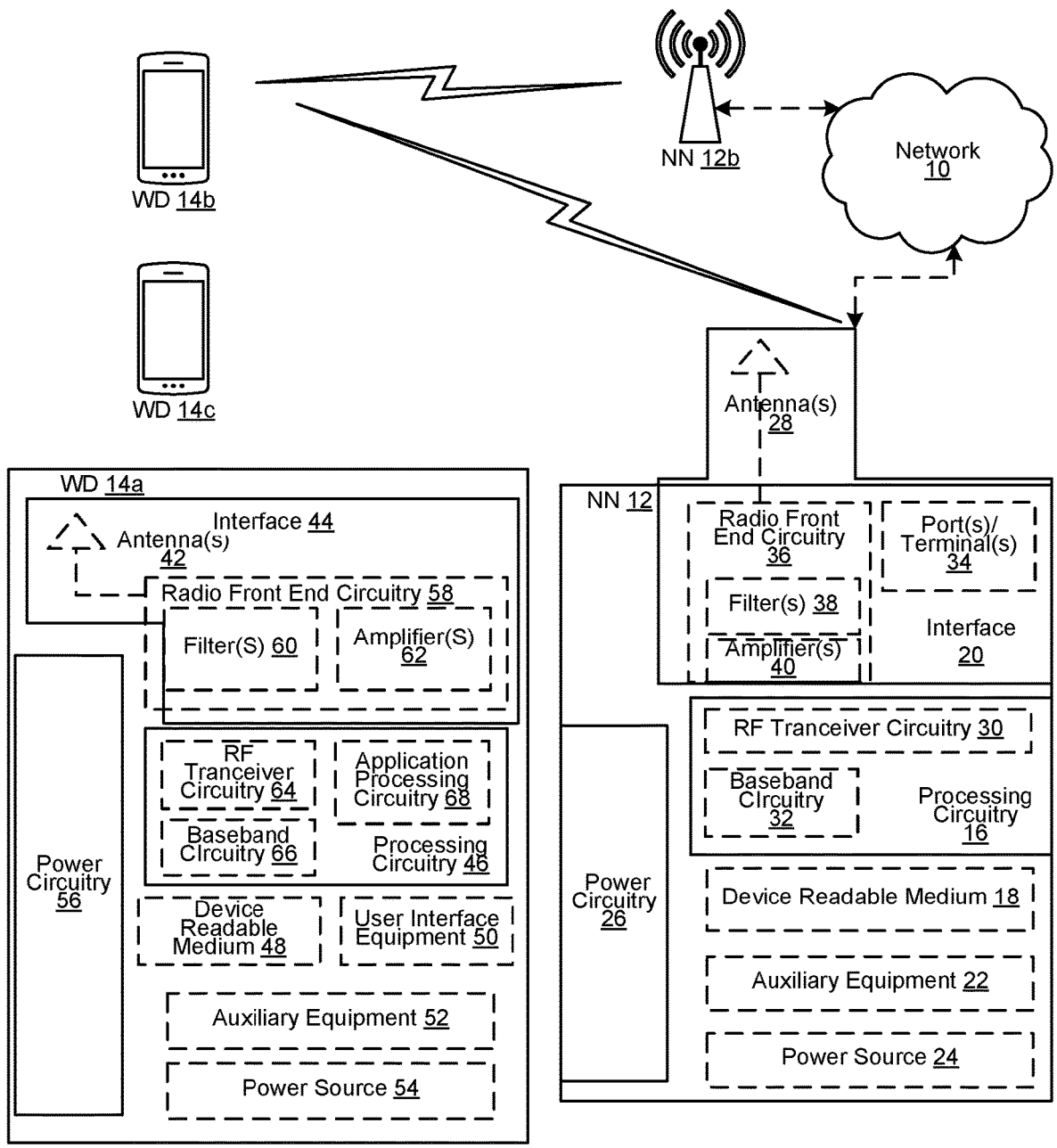
FIG. 1 illustrates a wireless network in accordance with some embodiments.

As discussed above, in certain practical situations, changing the above mentioned RRC configurations in a more dynamic manner could enhance system performance/capacity. Adding additional fields in DCI for switching among RRC configurations could be an option, but it is compromised by increased DCI payload and reduced reliability of physical downlink control channel (PDCCH) transmission considering in most cases one DCI field can only be associated to one configuration parameter, or just a combination of a few. Certain aspects of the present disclosure and their embodiments may provide solutions to these or other challenges.

Generally, all terms used herein are to be interpreted according to their ordinary meaning in the relevant technical field, unless a different meaning is clearly given and/or is implied from the context in which it is used. All references to a/an/the element, apparatus, component, means, step, etc. are to be interpreted openly as referring to at least one instance of the element, apparatus, component, means, step, etc., unless explicitly stated otherwise. The steps of any methods disclosed herein do not have to be performed in the exact order disclosed, unless a step is explicitly described as following or preceding another step and/or where it is implicit that a step must follow or precede another step. Any feature of any of the embodiments disclosed herein may be applied to any other embodiment, wherever appropriate. Likewise, any advantage of any of the embodiments may apply to any other embodiments, and vice versa. Other objectives, features and advantages of the enclosed embodiments will be apparent from the following description.

In some embodiments of the present disclosure we propose methods to define BWPs for a WD that are associated with not only RF parameters, but a full list of RRC configurations of physical channels, signals, WD procedures etc. The WD is then instructed to change RRC configuration(s) (e.g., uplink waveform, SRS allocation etc.) by switching the active BWP with a DCI/timer. Changing RRC configurations through DCI/Timer based BWP switch provides an efficient way of system adaptation by changing a full RRC profile associated with a BWP without RRC signaling.

The proposed "fast RRC re-configuration" via BWP DCI-based switching has the following benefits:

Significantly reduced latency/activation delay compared to using RRC reconfiguration (~2-3 ms vs ~20-100 ms).

Reduced overhead compared to using RRC reconfiguration (DCI payload vs RRC configuration payload).

Improved network Key Performance Indicators (KPIs) and WD Quality of Service (QoS) by enabling the design of frequent, adaptive RRC re-configuration strategies.

In some use-cases/embodiments, the performance gains are dependent on changing the RRC configuration in a timely fashion—e.g., semi-dynamic radio parameter configuration/indication (fast RRC configuration through DCI/timer based BWP switch) as a scheme for efficient system adaptation to the radio environment at network node and WD. Some embodiments may include one or more of the following:

Semi-dynamic radio parameter configuration/indication (though DCI/Timer based BWP switch), together with legacy semi-static RRC configuration and dynamic DCI indication, are integrated into three levels radio resource configuration framework. The three levels of radio resource configuration are coordinated and adjusted based on deployment conditions.

BWP specific RRC configurations are profiled into BRFP (BWP Radio Frequency Profile) groups for efficient BRP (BWP RRC Profile) adaptation—this cannot be done with existing RRC based mechanisms (even if payload overhead is ignored).

There are, proposed herein, various embodiments which address one or more of the issues disclosed herein.

Certain embodiments may provide one or more of the following technical advantage(s).

Changing RRC configurations through DCI/Timer based BWP switch may provide an efficient way of system adaptation by changing a full RRC profile associated with a BWP without RRC signalling.

The proposed "fast RRC re-configuration" via BWP DCI-based switching may have one or more of the following benefits:

Significantly reduced latency/activation delay compared to using RRC reconfiguration (~2-3 ms vs ~20-100 ms).

Reduced overhead compared to using RRC reconfiguration (DCI payload versus (vs) RRC configuration payload).

Improved network Key Performance Indicators (KPIs) and WD Quality of Service (QoS) by enabling the design of frequent, adaptive RRC re-configuration strategies.

In some use-cases/embodiments the performance gains are dependent on changing the RRC configuration in a timely fashion—this cannot be done with existing RRC based mechanisms (even if payload overhead is ignored).

Some of the embodiments contemplated herein will now be described more fully with reference to the accompanying drawings. Other embodiments, however, are contained within the scope of the subject matter disclosed herein, the disclosed subject matter should not be construed as limited to only the embodiments set forth herein; rather, these embodiments are provided by way of example to convey the scope of the subject matter to those skilled in the art.

Before describing in detail exemplary embodiments, it is noted that the embodiments reside primarily in combinations of apparatus components and processing steps related to arrangements for semi-dynamic configuration for mobile system. Accordingly, components have been represented where appropriate by conventional symbols in the drawings, showing only those specific details that are pertinent to understanding the embodiments so as not to obscure the disclosure with details that will be readily apparent to those of ordinary skill in the art having the benefit of the description herein.

As used herein, relational terms, such as "first" and "second," "top" and "bottom," and the like, may be used solely to distinguish one entity or element from another entity or element without necessarily requiring or implying any physical or logical relationship or order between such entities or elements.

Although the subject matter described herein may be implemented in any appropriate type of system using any suitable components, the embodiments disclosed herein are described in relation to a wireless network, such as the example wireless network illustrated in FIG. 1. For simplicity, the wireless network of FIG. 1 only depicts network 10, network nodes (NNs) 12 and 12b, and WDs 14, 14b, and 14c. In practice, a wireless network may further include any additional elements suitable to support communication between wireless devices or between a wireless device and another communication device, such as a landline telephone, a service provider, or any other network node (NN) or end device. Of the illustrated components, network node 12 and wireless device (WD) 14 are depicted with additional detail. The wireless network may provide communication and other types of services to one or more wireless devices to facilitate the wireless devices' access to and/or use of the services provided by, or via, the wireless network.

The wireless network may comprise and/or interface with any type of communication, telecommunication, data, cellular, and/or radio network or other similar type of system. In some embodiments, the wireless network may be configured to operate according to specific standards or other types of predefined rules or procedures. Thus, particular embodiments of the wireless network may implement communication standards, such as Global System for Mobile Communications (GSM), Universal Mobile Telecommunications System (UMTS), Long Term Evolution (LTE), and/or other suitable 2G, 3G, 4G, or 5G standards; wireless local area network (WLAN) standards, such as the IEEE 802.11 standards; and/or any other appropriate wireless communication standard, such as the Worldwide Interoperability for Microwave Access (WiMax), Bluetooth, Z-Wave and/or ZigBee standards.

Network 10 may comprise one or more backhaul networks, core networks, IP networks, public switched telephone networks (PSTNs), packet data networks, optical networks, wide-area networks (WANs), local area networks (LANs), wireless local area networks (WLANs), wired networks, wireless networks, metropolitan area networks, and other networks to enable communication between devices.

Network node 12 and WD 14 comprise various components described in more detail below. These components work together in order to provide network node and/or wireless device functionality, such as providing wireless connections in a wireless network. In different embodiments, the wireless network may comprise any number of wired or wireless networks, network nodes, base stations, controllers, wireless devices, relay stations, and/or any other components or systems that may facilitate or participate in the communication of data and/or signals whether via wired or wireless connections.

As used herein, network node refers to equipment capable, configured, arranged and/or operable to communicate directly or indirectly with a wireless device and/or with other network nodes or equipment in the wireless network to enable and/or provide wireless access to the wireless device and/or to perform other functions (e.g., administration) in the wireless network. Examples of network nodes include, but are not limited to, access points (APs) (e.g., radio access points), base stations (BSs) (e.g., radio base stations, Node Bs, evolved Node Bs (eNBs) and NR NodeBs (gNBs)). Base stations may be categorized based on the amount of coverage they provide (or, stated differently, their transmit power level) and may then also be referred to as femto base stations, pico base stations, micro base stations, or macro base stations. A base station may be a relay node or a relay donor node controlling a relay. A network node may also include one or more (or all) parts of a distributed radio base station such as centralized digital units and/or remote radio units (RRUs), sometimes referred to as Remote Radio Heads (RRHs). Such remote radio units may or may not be integrated with an antenna as an antenna integrated radio. Parts of a distributed radio base station may also be referred to as nodes in a distributed antenna system (DAS). Yet further examples of network nodes include multi-standard radio (MSR) equipment such as MSR BSs, network controllers such as radio network controllers (RNCs) or base station controllers (BSCs), base transceiver stations (BTSs), transmission points, transmission nodes, multi-cell/multi-cast coordination entities (MCEs), core network nodes (e.g., MSCs, MMEs), O&M nodes, OSS nodes, SON nodes, positioning nodes (e.g., E-SMLCs), and/or MDTs. As another example, a network node may be a virtual network node as described in more detail below. More generally, however, network nodes may represent any suitable device (or group of devices) capable, configured, arranged, and/or operable to enable and/or provide a wireless device with access to the wireless network or to provide some service to a wireless device that has accessed the wireless network.

In FIG. 1, network node 12 includes processing circuitry 16, device readable medium 18, interface 20, auxiliary equipment 22, power source 24, power circuitry 26, and antenna 28. Although network node 12 illustrated in the example wireless network of FIG. 1 may represent a device that includes the illustrated combination of hardware components, other embodiments may comprise network nodes with different combinations of components. It is to be understood that a network node comprises any suitable combination of hardware and/or software needed to perform the tasks, features, functions and methods disclosed herein. Moreover, while the components of network node 12 are depicted as single boxes located within a larger box, or nested within multiple boxes, in practice, a network node may comprise multiple different physical components that make up a single illustrated component (e.g., device readable medium 18 may comprise multiple separate hard drives as well as multiple RAM modules).

Similarly, network node 12 may be composed of multiple physically separate components (e.g., a NodeB component and a RNC component, or a BTS component and a BSC component, etc.), which may each have their own respective components. In certain scenarios in which network node 12 comprises multiple separate components (e.g., BTS and BSC components), one or more of the separate components may be shared among several network nodes. For example, a single RNC may control multiple NodeBs. In such a scenario, each unique NodeB and RNC pair, may in some instances be considered a single separate network node. In some embodiments, network node 12 may be configured to support multiple radio access technologies (RATs). In such embodiments, some components may be duplicated (e.g., separate device readable medium 18 for the different RATs) and some components may be reused (e.g., the same antenna 28 may be shared by the RATs). Network node 12 may also include multiple sets of the various illustrated components for different wireless technologies integrated into network node 12, such as, for example, GSM, WCDMA, LTE, NR, WiFi, or Bluetooth wireless technologies. These wireless technologies may be integrated into the same or different chip or set of chips and other components within network node 12.

Processing circuitry 16 is configured to perform any determining, calculating, or similar operations (e.g., certain obtaining operations) described herein as being provided by a network node. These operations performed by processing circuitry 16 may include processing information obtained by processing circuitry 16 by, for example, converting the obtained information into other information, comparing the obtained information or converted information to information stored in the network node, and/or performing one or more operations based on the obtained information or converted information, and as a result of said processing making a determination.

Processing circuitry 16 may comprise a combination of one or more of a microprocessor, controller, microcontroller, central processing unit, digital signal processor, application-specific integrated circuit, field programmable gate array, or any other suitable computing device, resource, or combination of hardware, software and/or encoded logic operable to provide, either alone or in conjunction with other network node 12 components, such as device readable medium 18, network node 12 functionality. For example, processing circuitry 16 may execute instructions stored in device readable medium 18 or in memory within processing circuitry 16. Such functionality may include providing any of the various wireless features, functions, or benefits discussed herein. In some embodiments, processing circuitry 16 may include a system on a chip (SOC).

In some embodiments, processing circuitry 16 may include one or more of radio frequency (RF) transceiver circuitry 30 and baseband processing circuitry 32. In some embodiments, radio frequency (RF) transceiver circuitry 30 and baseband processing circuitry 32 may be on separate chips (or sets of chips), boards, or units, such as radio units and digital units. In alternative embodiments, part or all of RF transceiver circuitry 30 and baseband processing circuitry 32 may be on the same chip or set of chips, boards, or units In certain embodiments, some or all of the functionality described herein as being provided by a network node, base station, eNB or other such network device may be performed by processing circuitry 16 executing instructions stored on device readable medium 18 or memory within processing circuitry 16. In alternative embodiments, some or all of the functionality may be provided by processing circuitry 16 without executing instructions stored on a separate or discrete device readable medium, such as in a hard-wired manner. In any of those embodiments, whether executing instructions stored on a device readable storage medium or not, processing circuitry 16 can be configured to perform the described functionality. The benefits provided by such functionality are not limited to processing circuitry 16 alone or to other components of network node 12, but are enjoyed by network node 12 as a whole, and/or by end users and the wireless network generally.

Device readable medium 18 may comprise any form of volatile or non-volatile computer readable memory including, without limitation, persistent storage, solid-state memory, remotely mounted memory, magnetic media, optical media, random access memory (RAM), read-only memory (ROM), mass storage media (for example, a hard disk), removable storage media (for example, a flash drive, a Compact Disk (CD) or a Digital Video Disk (DVD)), and/or any other volatile or non-volatile, non-transitory device readable and/or computer-executable memory devices that store information, data, and/or instructions that may be used by processing circuitry 16. Device readable medium 18 may store any suitable instructions, data or information, including a computer program, software, an application including one or more of logic, rules, code, tables, etc. and/or other instructions capable of being executed by processing circuitry 16 and, utilized by network node 12. Device readable medium 18 may be used to store any calculations made by processing circuitry 16 and/or any data received via interface 20. In some embodiments, processing circuitry 16 and device readable medium 18 may be considered to be integrated.

Interface 20 is used in the wired or wireless communication of signalling and/or data between network node 12, network 10, and/or WDs 14. As illustrated, interface 20 comprises port(s)/terminal(s) 34 to send and receive data, for example to and from network 10 over a wired connection. Interface 20 also includes radio front end circuitry 36 that may be coupled to, or in certain embodiments a part of, antenna 28. Radio front end circuitry 36 comprises filters 38 and amplifiers 40. Radio front end circuitry 36 may be connected to antenna 28 and processing circuitry 16. Radio front end circuitry may be configured to condition signals communicated between antenna 28 and processing circuitry 16. Radio front end circuitry 36 may receive digital data that is to be sent out to other network nodes or WDs via a wireless connection. Radio front end circuitry 36 may convert the digital data into a radio signal having the appropriate channel and bandwidth parameters using a combination of filters 38 and/or amplifiers 40. The radio signal may then be transmitted via antenna 28. Similarly, when receiving data, antenna 28 may collect radio signals which are then converted into digital data by radio front end circuitry 36. The digital data may be passed to processing circuitry 16. In other embodiments, the interface may comprise different components and/or different combinations of components.

In certain alternative embodiments, network node 12 may not include separate radio front end circuitry 36, instead, processing circuitry 16 may comprise radio front end circuitry and may be connected to antenna 28 without separate radio front end circuitry 36. Similarly, in some embodiments, all or some of RF transceiver circuitry 30 may be considered a part of interface 20. In still other embodiments, interface 20 may include one or more ports or terminals 34, radio front end circuitry 36, and RF transceiver circuitry 30, as part of a radio unit (not shown), and interface 20 may communicate with baseband processing circuitry 32, which is part of a digital unit (not shown).

Antenna 28 may include one or more antennas, or antenna arrays, configured to send and/or receive wireless signals. Antenna 28 may be coupled to radio front end circuitry 36 and may be any type of antenna capable of transmitting and receiving data and/or signals wirelessly. In some embodiments, antenna 28 may comprise one or more omni-directional, sector or panel antennas operable to transmit/receive radio signals between, for example, 2 GHz and 66 GHz. An omni-directional antenna may be used to transmit/receive radio signals in any direction, a sector antenna may be used to transmit/receive radio signals from devices within a particular area, and a panel antenna may be a line of sight antenna used to transmit/receive radio signals in a relatively straight line. In some instances, the use of more than one antenna may be referred to as MIMO. In certain embodiments, antenna 28 may be separate from network node 12 and may be connectable to network node 12 through an interface or port.

Antenna 28, interface 20, and/or processing circuitry 16 may be configured to perform any receiving operations and/or certain obtaining operations described herein as being performed by a network node. Any information, data and/or signals may be received from a wireless device, another network node and/or any other network equipment. Similarly, antenna 28, interface 20, and/or processing circuitry 16 may be configured to perform any transmitting operations described herein as being performed by a network node. Any information, data and/or signals may be transmitted to a wireless device, another network node and/or any other network equipment.

Power circuitry 26 may comprise, or be coupled to, power management circuitry and is configured to supply the components of network node 12 with power for performing the functionality described herein. Power circuitry 26 may receive power from power source 24. Power source 24 and/or power circuitry 26 may be configured to provide power to the various components of network node 12 in a form suitable for the respective components (e.g., at a voltage and current level needed for each respective component). Power source 24 may either be included in, or external to, power circuitry 26 and/or network node 12. For example, network node 12 may be connectable to an external power source (e.g., an electricity outlet) via an input circuitry or interface such as an electrical cable, whereby the external power source supplies power to power circuitry 26. As a further example, power source 24 may comprise a source of power in the form of a battery or battery pack which is connected to, or integrated in, power circuitry 26. The battery may provide backup power should the external power source fail. Other types of power sources, such as photovoltaic devices, may also be used.

Alternative embodiments of network node 12 may include additional components beyond those shown in FIG. 1 that may be responsible for providing certain aspects of the network node's functionality, including any of the functionality described herein and/or any functionality necessary to support the subject matter described herein. For example, network node 12 may include user interface equipment to allow input of information into network node 12 and to allow output of information from network node 12. This may allow a user to perform diagnostic, maintenance, repair, and other administrative functions for network node 12.

As used herein, wireless device (WD) refers to a device capable, configured, arranged and/or operable to communicate wirelessly with network nodes and/or other wireless devices. Unless otherwise noted, the term WD may be used interchangeably herein with user equipment (UE). Communicating wirelessly may involve transmitting and/or receiving wireless signals using electromagnetic waves, radio waves, infrared waves, and/or other types of signals suitable for conveying information through air. In some embodiments, a WD may be configured to transmit and/or receive information without direct human interaction. For instance, a WD may be designed to transmit information to a network on a predetermined schedule, when triggered by an internal or external event, or in response to requests from the network. Examples of a WD include, but are not limited to, a smart phone, a mobile phone, a cell phone, a voice over IP (VoIP) phone, a wireless local loop phone, a desktop computer, a personal digital assistant (PDA), a wireless cameras, a gaming console or device, a music storage device, a playback appliance, a wearable terminal device, a wireless endpoint, a mobile station, a tablet, a laptop, a laptop-embedded equipment (LEE), a laptop-mounted equipment (LME), a smart device, a wireless customer-premise equipment (CPE). a vehicle-mounted wireless terminal device, etc. A WD may support device-to-device (D2D) communication, for example by implementing a 3GPP standard for sidelink communication, vehicle-to-vehicle (V2V), vehicle-to-infrastructure (V2I), vehicle-to-everything (V2X) and may in this case be referred to as a D2D communication device. As yet another specific example, in an Internet of Things (IoT) scenario, a WD may represent a machine or other device that performs monitoring and/or measurements, and transmits the results of such monitoring and/or measurements to another WD and/or a network node. The WD may in this case be a machine-to-machine (M2M) device, which may in a 3GPP context be referred to as an MTC device. As one particular example, the WD may be a WD implementing the 3GPP narrow band Internet of things (NB-IoT) standard. Particular examples of such machines or devices are sensors, metering devices such as power meters, industrial machinery, or home or personal appliances (e.g., refrigerators, televisions, etc.) personal wearables (e.g., watches, fitness trackers, etc.). In other scenarios, a WD may represent a vehicle or other equipment that is capable of monitoring and/or reporting on its operational status or other functions associated with its operation. A WD as described above may represent the endpoint of a wireless connection, in which case the device may be referred to as a wireless terminal. Furthermore, a WD as described above may be mobile, in which case it may also be referred to as a mobile device or a mobile terminal.

As illustrated, wireless device 14 includes antenna 42, interface 44, processing circuitry 46, device readable medium 48, user interface equipment 50, auxiliary equipment 52, power source 54 and power circuitry 56. WD 14 may include multiple sets of one or more of the illustrated components for different wireless technologies supported by WD 14, such as, for example, GSM, WCDMA, LTE, NR, WiFi, WiMAX, or Bluetooth wireless technologies, just to mention a few. These wireless technologies may be integrated into the same or different chips or set of chips as other components within WD 14.

Antenna 42 may include one or more antennas or antenna arrays, configured to send and/or receive wireless signals, and is connected to interface 44. In certain alternative embodiments, antenna 42 may be separate from WD 14 and be connectable to WD 14 through an interface or port. Antenna 42, interface 44, and/or processing circuitry 46 may be configured to perform any receiving or transmitting operations described herein as being performed by a WD. Any information, data and/or signals may be received from a network node and/or another WD. In some embodiments, radio front end circuitry and/or antenna 42 may be considered an interface.

As illustrated, interface 44 comprises radio front end circuitry 58 and antenna 42. Radio front end circuitry 58 comprise one or more filters 60 and amplifiers 62. Radio front end circuitry 58 is connected to antenna 42 and processing circuitry 46, and is configured to condition signals communicated between antenna 42 and processing circuitry 46. Radio front end circuitry 58 may be coupled to or a part of antenna 42. In some embodiments, WD 14 may not include separate radio front end circuitry 58; rather, processing circuitry 46 may comprise radio front end circuitry and may be connected to antenna 42. Similarly, in some embodiments, some or all of RF transceiver circuitry 64 may be considered a part of interface 44. Radio front end circuitry 58 may receive digital data that is to be sent out to other network nodes or WDs via a wireless connection. Radio front end circuitry 58 may convert the digital data into a radio signal having the appropriate channel and bandwidth parameters using a combination of filters 60 and/or amplifiers 62. The radio signal may then be transmitted via antenna 42. Similarly, when receiving data, antenna 42 may collect radio signals which are then converted into digital data by radio front end circuitry 58. The digital data may be passed to processing circuitry 46. In other embodiments, the interface may comprise different components and/or different combinations of components.

Processing circuitry 46 may comprise a combination of one or more of a microprocessor, controller, microcontroller, central processing unit, digital signal processor, application-specific integrated circuit, field programmable gate array, or any other suitable computing device, resource, or combination of hardware, software, and/or encoded logic operable to provide, either alone or in conjunction with other WD 14 components, such as device readable medium 48, WD 14 functionality. Such functionality may include providing any of the various wireless features or benefits discussed herein. For example, processing circuitry 46 may execute instructions stored in device readable medium 48 or in memory within processing circuitry 46 to provide the functionality disclosed herein.

As illustrated, processing circuitry 46 includes one or more of RF transceiver circuitry 64, baseband processing circuitry 66, and application processing circuitry 68. In other embodiments, the processing circuitry may comprise different components and/or different combinations of components. In certain embodiments processing circuitry 46 of WD 14 may comprise a SOC. In some embodiments, RF transceiver circuitry 64, baseband processing circuitry 66, and application processing circuitry 68 may be on separate chips or sets of chips. In alternative embodiments, part or all of baseband processing circuitry 66 and application processing circuitry 68 may be combined into one chip or set of chips, and RF transceiver circuitry 64 may be on a separate chip or set of chips. In still alternative embodiments, part or all of RF transceiver circuitry 64 and baseband processing circuitry 66 may be on the same chip or set of chips, and application processing circuitry 68 may be on a separate chip or set of chips. In yet other alternative embodiments, part or all of RF transceiver circuitry 64, baseband processing circuitry 66, and application processing circuitry 68 may be combined in the same chip or set of chips. In some embodiments, RF transceiver circuitry 64 may be a part of interface 44. RF transceiver circuitry 64 may condition RF signals for processing circuitry 46.

In certain embodiments, some or all of the functionality described herein as being performed by a WD may be provided by processing circuitry 46 executing instructions stored on device readable medium 48, which in certain embodiments may be a computer-readable storage medium. In alternative embodiments, some or all of the functionality may be provided by processing circuitry 46 without executing instructions stored on a separate or discrete device readable storage medium, such as in a hard-wired manner. In any of those particular embodiments, whether executing instructions stored on a device readable storage medium or not, processing circuitry 46 can be configured to perform the described functionality. The benefits provided by such functionality are not limited to processing circuitry 46 alone or to other components of WD 14, but are enjoyed by WD 14 as a whole, and/or by end users and the wireless network generally.

Processing circuitry 46 may be configured to perform any determining, calculating, or similar operations (e.g., certain obtaining operations) described herein as being performed by a WD. These operations, as performed by processing circuitry 46, may include processing information obtained by processing circuitry 46 by, for example, converting the obtained information into other information, comparing the obtained information or converted information to information stored by WD 14, and/or performing one or more operations based on the obtained information or converted information, and as a result of said processing making a determination.

Device readable medium 48 may be operable to store a computer program, software, an application including one or more of logic, rules, code, tables, etc. and/or other instructions capable of being executed by processing circuitry 46. Device readable medium 48 may include computer memory (e.g., Random Access Memory (RAM) or Read Only Memory (ROM)), mass storage media (e.g., a hard disk), removable storage media (e.g., a Compact Disk (CD) or a Digital Video Disk (DVD)), and/or any other volatile or non-volatile, non-transitory device readable and/or computer executable memory devices that store information, data, and/or instructions that may be used by processing circuitry 46. In some embodiments, processing circuitry 46 and device readable medium 48 may be considered to be integrated.

User interface equipment 50 may provide components that allow for a human user to interact with WD 14. Such interaction may be of many forms, such as visual, audial, tactile, etc. User interface equipment 50 may be operable to produce output to the user and to allow the user to provide input to WD 14. The type of interaction may vary depending on the type of user interface equipment 50 installed in WD 14. For example, if WD 14 is a smart phone, the interaction may be via a touch screen; if WD 14 is a smart meter, the interaction may be through a screen that provides usage (e.g., the number of gallons used) or a speaker that provides an audible alert (e.g., if smoke is detected). User interface equipment 50 may include input interfaces, devices and circuits, and output interfaces, devices and circuits. User interface equipment 50 is configured to allow input of information into WD 14, and is connected to processing circuitry 46 to allow processing circuitry 46 to process the input information. User interface equipment 50 may include, for example, a microphone, a proximity or other sensor, keys/buttons, a touch display, one or more cameras, a USB port, or other input circuitry. User interface equipment 50 is also configured to allow output of information from WD 14, and to allow processing circuitry 46 to output information from WD 14. User interface equipment 50 may include, for example, a speaker, a display, vibrating circuitry, a USB port, a headphone interface, or other output circuitry. Using one or more input and output interfaces, devices, and circuits, of user interface equipment 50, WD 14 may communicate with end users and/or the wireless network, and allow them to benefit from the functionality described herein.

Auxiliary equipment 52 is operable to provide more specific functionality which may not be generally performed by WDs. This may comprise specialized sensors for doing measurements for various purposes, interfaces for additional types of communication such as wired communications etc. The inclusion and type of components of auxiliary equipment 52 may vary depending on the embodiment and/or scenario.

Power source 54 may, in some embodiments, be in the form of a battery or battery pack. Other types of power sources, such as an external power source (e.g., an electricity outlet), photovoltaic devices or power cells, may also be used. WD 14 may further comprise power circuitry 56 for delivering power from power source 54 to the various parts of WD 14 which need power from power source 54 to carry out any functionality described or indicated herein. Power circuitry 56 may in certain embodiments comprise power management circuitry. Power circuitry 56 may additionally or alternatively be operable to receive power from an external power source; in which case WD 14 may be connectable to the external power source (such as an electricity outlet) via input circuitry or an interface such as an electrical power cable. Power circuitry 56 may also in certain embodiments be operable to deliver power from an external power source to power source 54. This may be, for example, for the charging of power source 54. Power circuitry 56 may perform any formatting, converting, or other modification to the power from power source 54 to make the power suitable for the respective components of WD 14 to which power is supplied.

Figure 2:
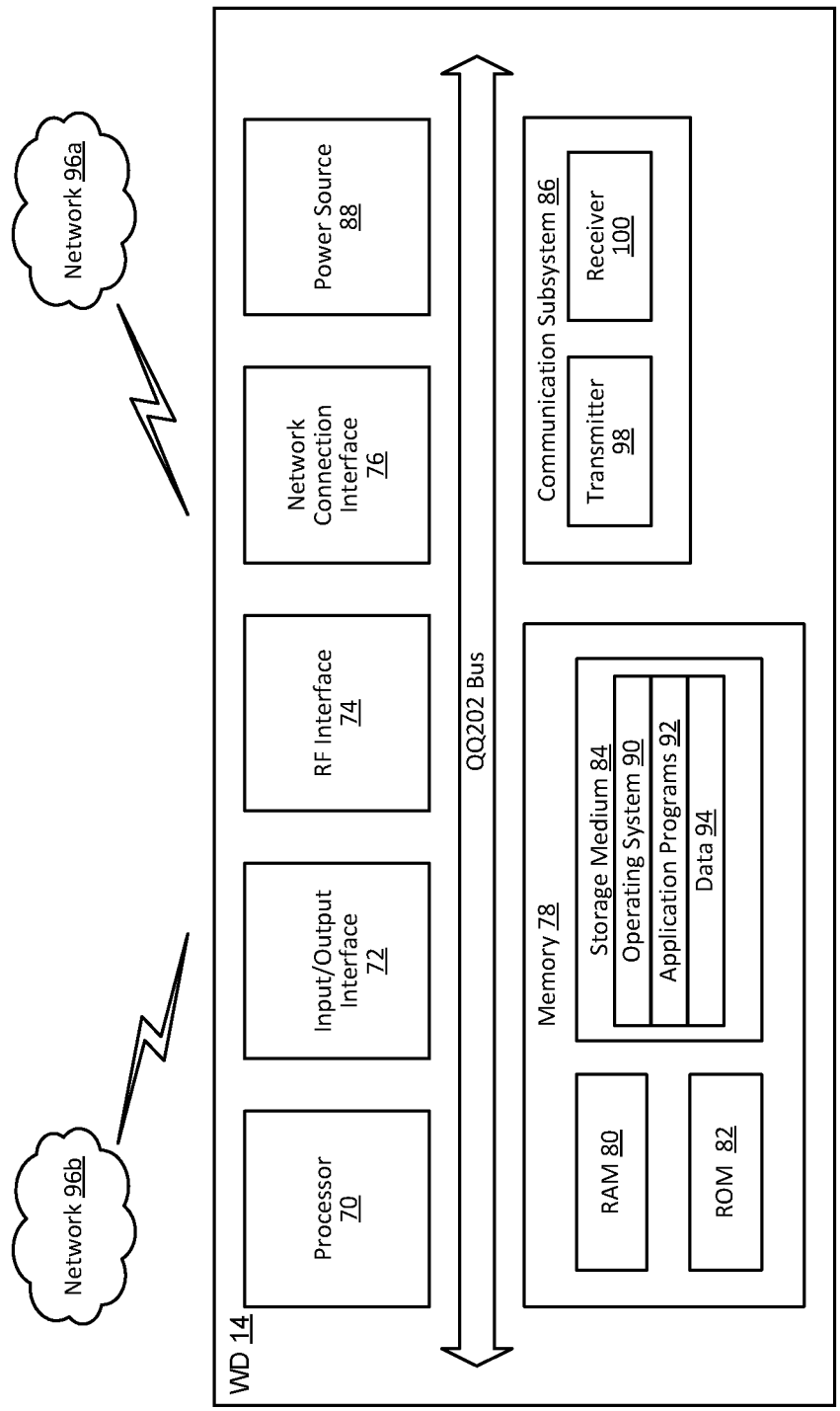
FIG. 2 illustrates a wireless device in accordance with some embodiments.

FIG. 2 illustrates one embodiment of a WD 14 in accordance with various aspects described herein. As used herein, a user equipment or WD 14 may not necessarily have a user in the sense of a human user who owns and/or operates the relevant device. Instead, a WD 14 may represent a device that is intended for sale to, or operation by, a human user but which may not, or which may not initially, be associated with a specific human user (e.g., a smart sprinkler controller). Alternatively, a WD 14 may represent a device that is not intended for sale to, or operation by, an end user but which may be associated with or operated for the benefit of a user (e.g., a smart power meter). WD 14 may be any WD identified by the $3^{rd}$ Generation Partnership Project (3GPP), including a NB-IoT WD, a machine type communication (MTC) WD, and/or an enhanced MTC (eMTC) WD. WD 14, as illustrated in FIG. 2, is one example of a WD 14 configured for communication in accordance with one or more communication standards promulgated by the $3^{rd}$ Generation Partnership Project (3GPP), such as 3GPP's GSM, UMTS, LTE, and/or 5G standards. As mentioned previously, the term WD and UE may be used interchangeable. Accordingly, although FIG. 2 is a WD 14, the components discussed herein are equally applicable to a UE, and vice-versa.

In FIG. 2, WD 14 includes processing circuitry 70 that is operatively coupled to input/output interface 72, radio frequency (RF) interface 74, network connection interface 76, memory 78 including random access memory (RAM) 80, read-only memory (ROM) 82, and storage medium 84 or the like, communication subsystem 86, power source 88, and/or any other component, or any combination thereof. Storage medium 84 includes operating system 90, application program 92, and data 94. In other embodiments, storage medium 84 may include other similar types of information. Certain WDs may utilize all of the components shown in FIG. 2, or only a subset of the components. The level of integration between the components may vary from one WD to another WD. Further, certain WDs may contain multiple instances of a component, such as multiple processors, memories, transceivers, transmitters, receivers, etc.

In FIG. 2, processing circuitry 70 may be configured to process computer instructions and data. Processing circuitry 70 may be configured to implement any sequential state machine operative to execute machine instructions stored as machine-readable computer programs in the memory, such as one or more hardware-implemented state machines (e.g., in discrete logic, FPGA, ASIC, etc.); programmable logic together with appropriate firmware; one or more stored program, general-purpose processors, such as a microprocessor or Digital Signal Processor (DSP), together with appropriate software; or any combination of the above. For example, the processing circuitry 70 may include two central processing units (CPUs). Data may be information in a form suitable for use by a computer.

In the depicted embodiment, input/output interface 72 may be configured to provide a communication interface to an input device, output device, or input and output device. WD 14 may be configured to use an output device via input/output interface 72. An output device may use the same type of interface port as an input device. For example, a USB port may be used to provide input to and output from WD 14. The output device may be a speaker, a sound card, a video card, a display, a monitor, a printer, an actuator, an emitter, a smartcard, another output device, or any combination thereof. WD 14 may be configured to use an input device via input/output interface 72 to allow a user to capture information into WD 14. The input device may include a touch-sensitive or presence-sensitive display, a camera (e.g., a digital camera, a digital video camera, a web camera, etc.), a microphone, a sensor, a mouse, a trackball, a directional pad, a trackpad, a scroll wheel, a smartcard, and the like. The presence-sensitive display may include a capacitive or resistive touch sensor to sense input from a user. A sensor may be, for instance, an accelerometer, a gyroscope, a tilt sensor, a force sensor, a magnetometer, an optical sensor, a proximity sensor, another like sensor, or any combination thereof. For example, the input device may be an accelerometer, a magnetometer, a digital camera, a microphone, and an optical sensor.

In FIG. 2, RF interface 74 may be configured to provide a communication interface to RF components such as a transmitter, a receiver, and an antenna. Network connection interface 76 may be configured to provide a communication interface to network 96a. Network 96a may encompass wired and/or wireless networks such as a local-area network (LAN), a wide-area network (WAN), a computer network, a wireless network, a telecommunications network, another like network or any combination thereof. For example, network 96a may comprise a Wi-Fi network. Network connection interface 76 may be configured to include a receiver and a transmitter interface used to communicate with one or more other devices over a communication network according to one or more communication protocols, such as Ethernet, TCP/IP, SONET, ATM, or the like. Network connection interface 76 may implement receiver and transmitter functionality appropriate to the communication network links (e.g., optical, electrical, and the like). The transmitter and receiver functions may share circuit components, software or firmware, or alternatively may be implemented separately.

RAM 80 may be configured to interface via bus QQ202 to processing circuitry 70 to provide storage or caching of data or computer instructions during the execution of software programs such as the operating system, application programs, and device drivers. ROM 82 may be configured to provide computer instructions or data to processing circuitry 70. For example, ROM 82 may be configured to store invariant low-level system code or data for basic system functions such as basic input and output (I/O), startup, or reception of keystrokes from a keyboard that are stored in a non-volatile memory. Storage medium 84 may be configured to include memory such as RAM, ROM, programmable read-only memory (PROM), erasable programmable read-only memory (EPROM), electrically erasable programmable read-only memory (EEPROM), magnetic disks, optical disks, floppy disks, hard disks, removable cartridges, or flash drives. In one example, storage medium 84 may be configured to include operating system 90, application program 92 such as a web browser application, a widget or gadget engine or another application, and data file 94. Storage medium 84 may store, for use by WD 14, any of a variety of various operating systems or combinations of operating systems.

Storage medium 84 may be configured to include a number of physical drive units, such as redundant array of independent disks (RAID), floppy disk drive, flash memory, USB flash drive, external hard disk drive, thumb drive, pen drive, key drive, high-density digital versatile disc (HD-DVD) optical disc drive, internal hard disk drive, Blu-Ray optical disc drive, holographic digital data storage (HDDS) optical disc drive, external mini-dual in-line memory module (DIMM), synchronous dynamic random access memory (SDRAM), external micro-DIMM SDRAM, smartcard memory such as a subscriber identity module or a removable user identity (SIM/RUIM) module, other memory, or any combination thereof. Storage medium 84 may allow WD 14 to access computer-executable instructions, application programs or the like, stored on transitory or non-transitory memory media, to off-load data, or to upload data. An article of manufacture, such as one utilizing a communication system may be tangibly embodied in storage medium 84, which may comprise a device readable medium.

In FIG. 2, processing circuitry 70 may be configured to communicate with network 96b using communication subsystem 86. Network 96a and network 96b may be the same network or networks or different network or networks. Communication subsystem 86 may be configured to include one or more transceivers used to communicate with network 96b. For example, communication subsystem 86 may be configured to include one or more transceivers used to communicate with one or more remote transceivers of another device capable of wireless communication such as another WD/UE, or base station of a radio access network (RAN) according to one or more communication protocols, such as IEEE 802.11, CDMA, WCDMA, GSM, LTE, UTRAN, WiMax, or the like. Each transceiver may include transmitter 98 and/or receiver 100 to implement transmitter or receiver functionality, respectively, appropriate to the RAN links (e.g., frequency allocations and the like). Further, transmitter 98 and receiver 100 of each transceiver may share circuit components, software or firmware, or alternatively may be implemented separately.

In the illustrated embodiment, the communication functions of communication subsystem 86 may include data communication, voice communication, multimedia communication, short-range communications such as Bluetooth, near-field communication, location-based communication such as the use of the global positioning system (GPS) to determine a location, another like communication function, or any combination thereof. For example, communication subsystem 86 may include cellular communication, Wi-Fi communication, Bluetooth communication, and GPS communication. Network 96b may encompass wired and/or wireless networks such as a local-area network (LAN), a wide-area network (WAN), a computer network, a wireless network, a telecommunications network, another like network or any combination thereof. For example, network 96b may be a cellular network, a Wi-Fi network, and/or a near-field network. Power source QQ213 may be configured to provide alternating current (AC) or direct current (DC) power to components of WD 14.

The features, benefits and/or functions described herein may be implemented in one of the components of WD 14 or partitioned across multiple components of WD 14. Further, the features, benefits, and/or functions described herein may be implemented in any combination of hardware, software or firmware. In one example, communication subsystem 86 may be configured to include any of the components described herein. Further, processing circuitry 70 may be configured to communicate with any of such components over bus QQ202. In another example, any of such components may be represented by program instructions stored in memory that when executed by processing circuitry 70 perform the corresponding functions described herein. In another example, the functionality of any of such components may be partitioned between processing circuitry 70 and communication subsystem 86. In another example, the non-computationally intensive functions of any of such components may be implemented in software or firmware and the computationally intensive functions may be implemented in hardware.

Figure 3:
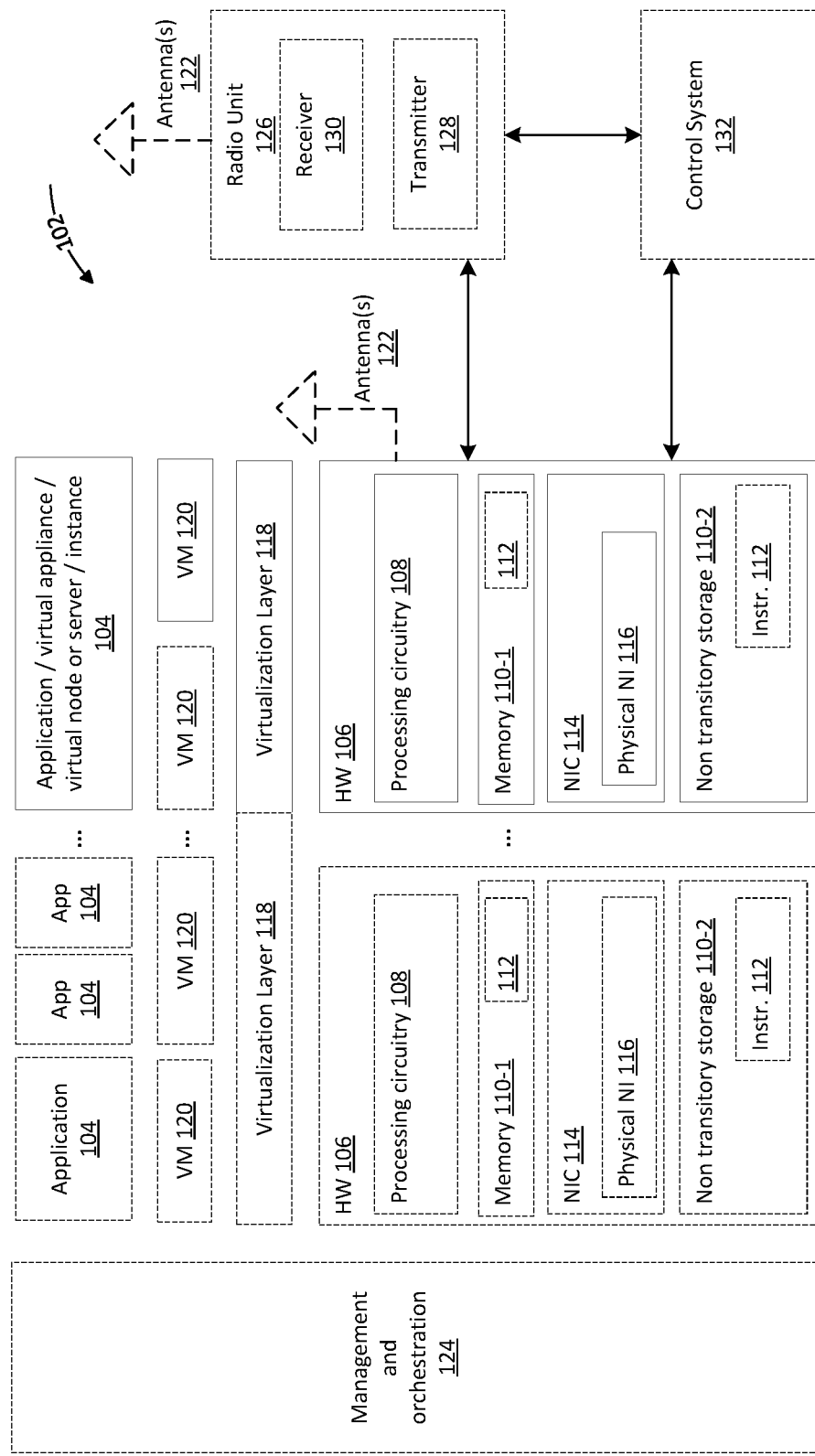
FIG. 3 illustrates a virtualization environment in accordance with some embodiments.

FIG. 3 is a schematic block diagram illustrating a virtualization environment 102 in which functions implemented by some embodiments may be virtualized. In the present context, virtualizing means creating virtual versions of apparatuses or devices which may include virtualizing hardware platforms, storage devices and networking resources. As used herein, virtualization can be applied to a node (e.g., a virtualized base station or a virtualized radio access node) or to a device (e.g., a WD, a wireless device or any other type of communication device) or components thereof and relates to an implementation in which at least a portion of the functionality is implemented as one or more virtual components (e.g., via one or more applications, components, functions, virtual machines or containers executing on one or more physical processing nodes in one or more networks).

In some embodiments, some or all of the functions described herein may be implemented as virtual components executed by one or more virtual machines implemented in one or more virtual environments 102 hosted by one or more of hardware nodes 106. Further, in embodiments in which the virtual node is not a radio access node or does not require radio connectivity (e.g., a core network node), then the network node may be entirely virtualized.

The functions may be implemented by one or more applications 104 (which may alternatively be called software instances, virtual appliances, network functions, virtual nodes, virtual network functions, etc.) operative to implement some of the features, functions, and/or benefits of some of the embodiments disclosed herein. Applications 104 are run in virtualization environment 102 which provides hardware 106 comprising processing circuitry 108 and memory 110. Memory 110 contains instructions 112 executable by processing circuitry 108 whereby application 104 is operative to provide one or more of the features, benefits, and/or functions disclosed herein.

Virtualization environment 102, comprises general-purpose or special-purpose network hardware devices 106 comprising a set of one or more processors or processing circuitry 108, which may be commercial off-the-shelf (COTS) processors, dedicated Application Specific Integrated Circuits (ASICs), or any other type of processing circuitry including digital or analog hardware components or special purpose processors. Each hardware device may comprise memory 110-1 which may be non-persistent memory for temporarily storing instructions 112 or software executed by processing circuitry 108. Each hardware device may comprise one or more network interface controllers (NICs) 114, also known as network interface cards, which include physical network interface 116. Each hardware device may also include non-transitory, persistent, machine-readable storage media 110-2 having stored therein software 112 and/or instructions executable by processing circuitry 108. Software 112 may include any type of software including software for instantiating one or more virtualization layers 118 (also referred to as hypervisors), software to execute virtual machines 120 as well as software allowing it to execute functions, features and/or benefits described in relation with some embodiments described herein.

Virtual machines 120, comprise virtual processing, virtual memory, virtual networking or interface and virtual storage, and may be run by a corresponding virtualization layer 118 or hypervisor. Different embodiments of the instance of virtual applicant 104 may be implemented on one or more of virtual machines 120, and the implementations may be made in different ways.

During operation, processing circuitry 108 executes software 112 to instantiate the hypervisor or virtualization layer 118, which may sometimes be referred to as a virtual machine monitor (VMM). Virtualization layer 118 may present a virtual operating platform that appears like networking hardware to virtual machine 120.

As shown in FIG. 3, hardware 106 may be a standalone network node with generic or specific components. Hardware 106 may comprise antenna 122 and may implement some functions via virtualization. Alternatively, hardware 106 may be part of a larger cluster of hardware (e.g., such as in a data center or customer premise equipment (CPE)) where many hardware nodes work together and are managed via management and orchestration (MANO) 124, which, among others, oversees lifecycle management of applications 104.

Virtualization of the hardware is in some contexts referred to as network function virtualization (NFV). NFV may be used to consolidate many network equipment types onto industry standard high volume server hardware, physical switches, and physical storage, which can be located in data centers, and customer premise equipment.

In the context of NFV, virtual machine 120 may be a software implementation of a physical machine that runs programs as if they were executing on a physical, non-virtualized machine. Each of virtual machines 120, and that part of hardware 106 that executes that virtual machine, be it hardware dedicated to that virtual machine and/or hardware shared by that virtual machine with others of the virtual machines 120, forms a separate virtual network elements (VNE).

Still in the context of NFV, Virtual Network Function (VNF) is responsible for handling specific network functions that run in one or more virtual machines 120 on top of hardware networking infrastructure 106 and corresponds to application 104 in FIG. 3.

In some embodiments, one or more radio units 126 that each include one or more transmitters 128 and one or more receivers 130 may be coupled to one or more antennas 122. Radio units 126 may communicate directly with hardware nodes 106 via one or more appropriate network interfaces and may be used in combination with the virtual components to provide a virtual node with radio capabilities, such as a radio access node or a base station.

In some embodiments, some signalling can be affected with the use of control system 132 which may alternatively be used for communication between the hardware nodes 106 and radio units 126.

Figure 4:
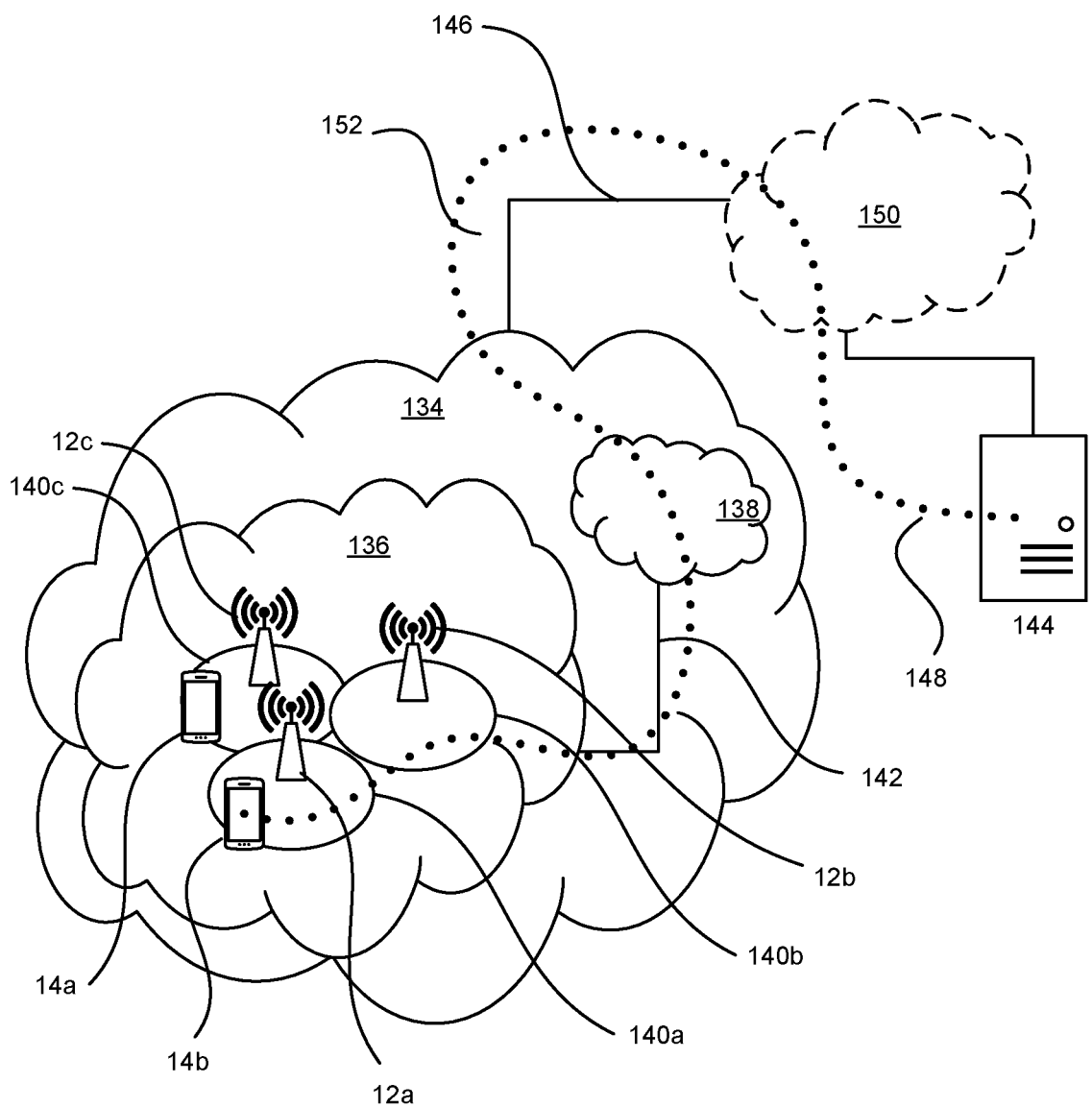
FIG. 4 illustrates a telecommunication network connected via an intermediate network to host a computer in accordance with some embodiments.

With reference to FIG. 4, in accordance with an embodiment, a communication system includes telecommunication network 134, such as a 3GPP-type cellular network, which comprises access network 136, such as a radio access network, and core network 138. Access network 136 comprises a plurality of network nodes 12a, 12b, 12c, such as NBs, eNBs, gNBs or other types of wireless access points, each defining a corresponding coverage area 140a, 140b, 140c. Each network node 12a, 12b, 12c is connectable to core network 138 over a wired or wireless connection 142. A first WD 14a located in coverage area 140c is configured to wirelessly connect to, or be paged by, the corresponding network node 12c. A second WD 14b in coverage area 140a is wirelessly connectable to the corresponding network node 12a. While a plurality of WDs 14a, 14b are illustrated in this example, the disclosed embodiments are equally applicable to a situation where a sole WD is in the coverage area or where a sole WD is connecting to the corresponding network node 12.

Telecommunication network 134 is itself connected to host computer 144, which may be embodied in the hardware and/or software of a standalone server, a cloud-implemented server, a distributed server or as processing resources in a server farm. Host computer 144 may be under the ownership or control of a service provider, or may be operated by the service provider or on behalf of the service provider. Connections 146 and 148 between telecommunication network 134 and host computer 144 may extend directly from core network 138 to host computer 144 or may go via an optional intermediate network 150. Intermediate network 150 may be one of, or a combination of more than one of, a public, private or hosted network; intermediate network 150, if any, may be a backbone network or the Internet; in particular, intermediate network 150 may comprise two or more sub-networks (not shown).

The communication system of FIG. 4 as a whole enables connectivity between the connected WDs 14a, 14b and host computer 144. The connectivity may be described as an over-the-top (OTT) connection 152. Host computer 144 and the connected WDs 14a, 14b are configured to communicate data and/or signaling via OTT connection 152, using access network 136, core network 138, any intermediate network 150 and possible further infrastructure (not shown) as intermediaries. OTT connection 152 may be transparent in the sense that the participating communication devices through which OTT connection 152 passes are unaware of routing of uplink and downlink communications. For example, network node 12 may not or need not be informed about the past routing of an incoming downlink communication with data originating from host computer 144 to be forwarded (e.g., handed over) to a connected WD 14a. Similarly, network node 12 need not be aware of the future routing of an outgoing uplink communication originating from the WD 14a towards the host computer 144.

Example implementations, in accordance with an embodiment, of the WD, network node and host computer discussed in the preceding paragraphs will now be described with reference to FIG. 5. In communication system 154, host computer 144 comprises hardware 156 including communication interface 158 configured to set up and maintain a wired or wireless connection with an interface of a different communication device of communication system 154. Host computer 144 further comprises processing circuitry 160, which may have storage and/or processing capabilities. In particular, processing circuitry 160 may comprise one or more programmable processors, application-specific integrated circuits, field programmable gate arrays or combinations of these (not shown) adapted to execute instructions. Host computer 144 further comprises software 162, which is stored in or accessible by host computer 144 and executable by processing circuitry 160. Software 162 includes host application 164. Host application 164 may be operable to provide a service to a remote user, such as WD 14 connecting via OTT connection 166 terminating at WD 14 and host computer 144. In providing the service to the remote user, host application 164 may provide user data which is transmitted using OTT connection 166.

Communication system 154 further includes network node 12 provided in a telecommunication system and comprising hardware 168 enabling it to communicate with host computer 144 and with WD 14. Hardware 168 may include communication interface 170 for setting up and maintaining a wired or wireless connection with an interface of a different communication device of communication system 154, as well as radio interface 172 for setting up and maintaining at least wireless connection 174 with WD 14 located in a coverage area (not shown in FIG. 5) served by network node 12. Communication interface 170 may be configured to facilitate connection 176 to host computer 144. Connection 176 may be direct or it may pass through a core network (not shown in FIG. 5) of the telecommunication system and/or through one or more intermediate networks outside the telecommunication system. In the embodiment shown, hardware 168 of network node 12 further includes processing circuitry 178, which may comprise one or more programmable processors, application-specific integrated circuits, field programmable gate arrays or combinations of these (not shown) adapted to execute instructions. Network node 12 further has software 180 stored internally or accessible via an external connection.

Communication system 154 further includes WD 14 already referred to. Its hardware 182 may include radio interface 184 configured to set up and maintain wireless connection 174 with a network node serving a coverage area in which WD 14 is currently located. Hardware 182 of WD 14 further includes processing circuitry 186, which may comprise one or more programmable processors, application-specific integrated circuits, field programmable gate arrays or combinations of these (not shown) adapted to execute instructions. WD 14 further comprises software 186, which is stored in or accessible by WD 14 and executable by processing circuitry 186. Software 186 includes client application 188. Client application 188 may be operable to provide a service to a human or non-human user via WD 14, with the support of host computer 144. In host computer 144, an executing host application 164 may communicate with the executing client application 188 via OTT connection 166 terminating at WD 14 and host computer 144. In providing the service to the user, client application 188 may receive request data from host application 164 and provide user data in response to the request data. OTT connection 166 may transfer both the request data and the user data. Client application 188 may interact with the user to generate the user data that it provides.

Figure 5:
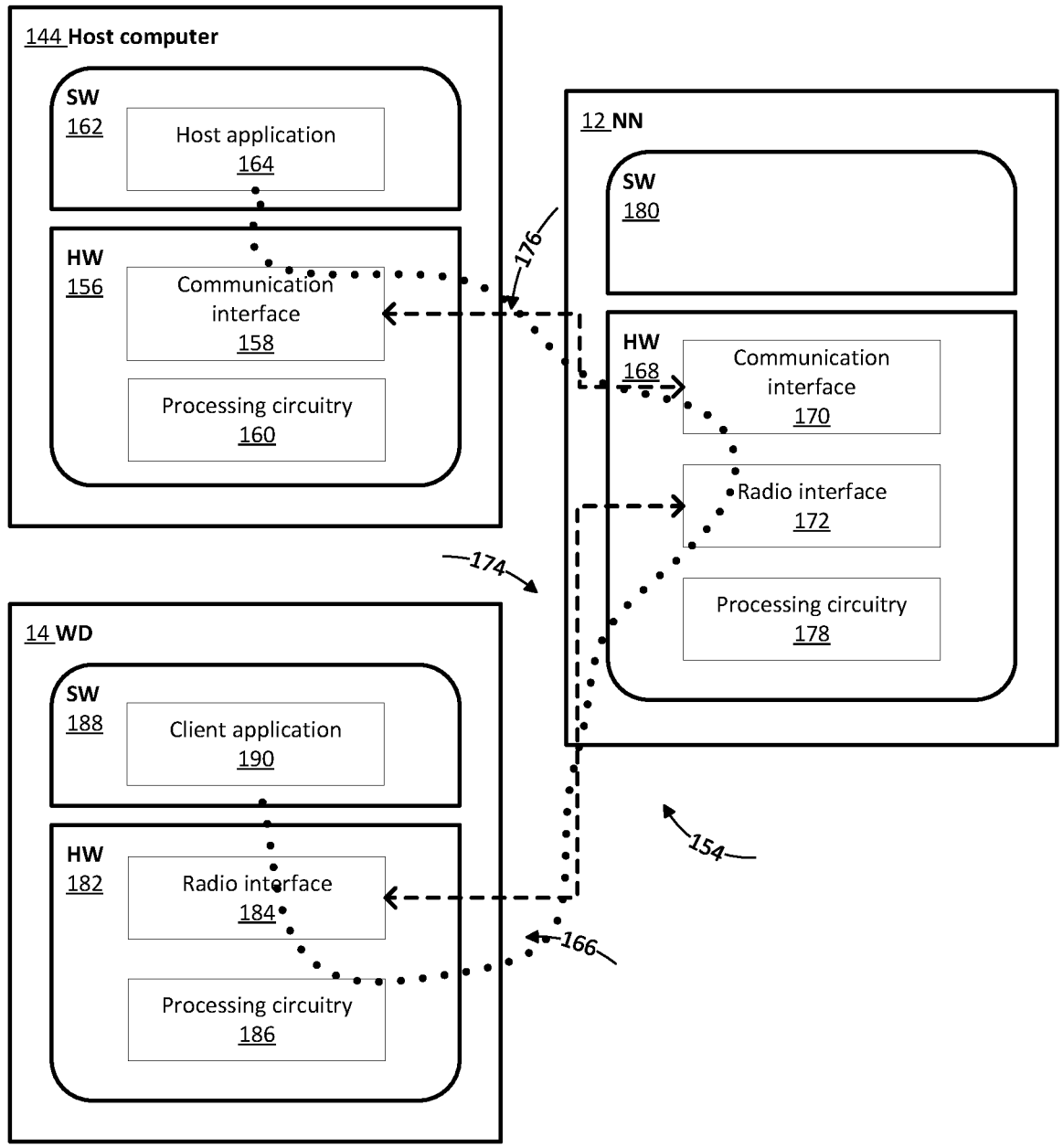
FIG. 5 illustrates a host computer communicating via a base station with a user equipment over a partially wireless connection in accordance with some embodiments.

It is noted that host computer 144, network node 12 and WD 14 illustrated in FIG. 5 may be similar or identical to host computer 144, one of network nodes 12a, 12b, 12c and one of WDs 14, 14b of FIG. 4, respectively. This is to say, the inner workings of these entities may be as shown in FIG. 5 and independently, the surrounding network topology may be that of FIG. 4.

In FIG. 5, OTT connection 166 has been drawn abstractly to illustrate the communication between host computer 144 and WD 14 via network node 12, without explicit reference to any intermediary devices and the precise routing of messages via these devices. Network infrastructure may determine the routing, which it may be configured to hide from WD 14 or from the service provider operating host computer 144, or both. While OTT connection 166 is active, the network infrastructure may further take decisions by which it dynamically changes the routing (e.g., on the basis of load balancing consideration or reconfiguration of the network).

Wireless connection 174 between WD 14 and network node 12 is in accordance with the teachings of the embodiments described throughout this disclosure. One or more of the various embodiments improve the performance of OTT services provided to WD 14 using OTT connection 166, in which wireless connection 174 forms the last segment. More precisely, the teachings of these embodiments may improve the latency/activation delay, reducing overhead, improving Network Key Performance Indicators (KPI) and WD Quality of Service (QoS) and thereby provide benefits such as an efficient way of system adaptation by changing a full RRC profile associated with a BWP without RRC signaling.

A measurement procedure may be provided for the purpose of monitoring data rate, latency and other factors on which the one or more embodiments improve. There may further be an optional network functionality for reconfiguring OTT connection 166 between host computer 144 and WD 14, in response to variations in the measurement results. The measurement procedure and/or the network functionality for reconfiguring OTT connection 166 may be implemented in software 162 and hardware 156 of host computer 144 or in software 186 and hardware 182 of WD 14, or both. In embodiments, sensors (not shown) may be deployed in or in association with communication devices through which OTT connection 166 passes; the sensors may participate in the measurement procedure by supplying values of the monitored quantities exemplified above, or supplying values of other physical quantities from which software 162, 186 may compute or estimate the monitored quantities. The reconfiguring of OTT connection 166 may include message format, retransmission settings, preferred routing etc.; the reconfiguring need not affect network node 12, and it may be unknown or imperceptible to network node 12. Such procedures and functionalities may be known and practiced in the art. In certain embodiments, measurements may involve proprietary WD signaling facilitating host computer 144's measurements of throughput, propagation times, latency and the like. The measurements may be implemented in that software 162 and 186 causes messages to be transmitted, in particular empty or 'dummy' messages, using OTT connection 166 while it monitors propagation times, errors etc.

Figures 6, 7:
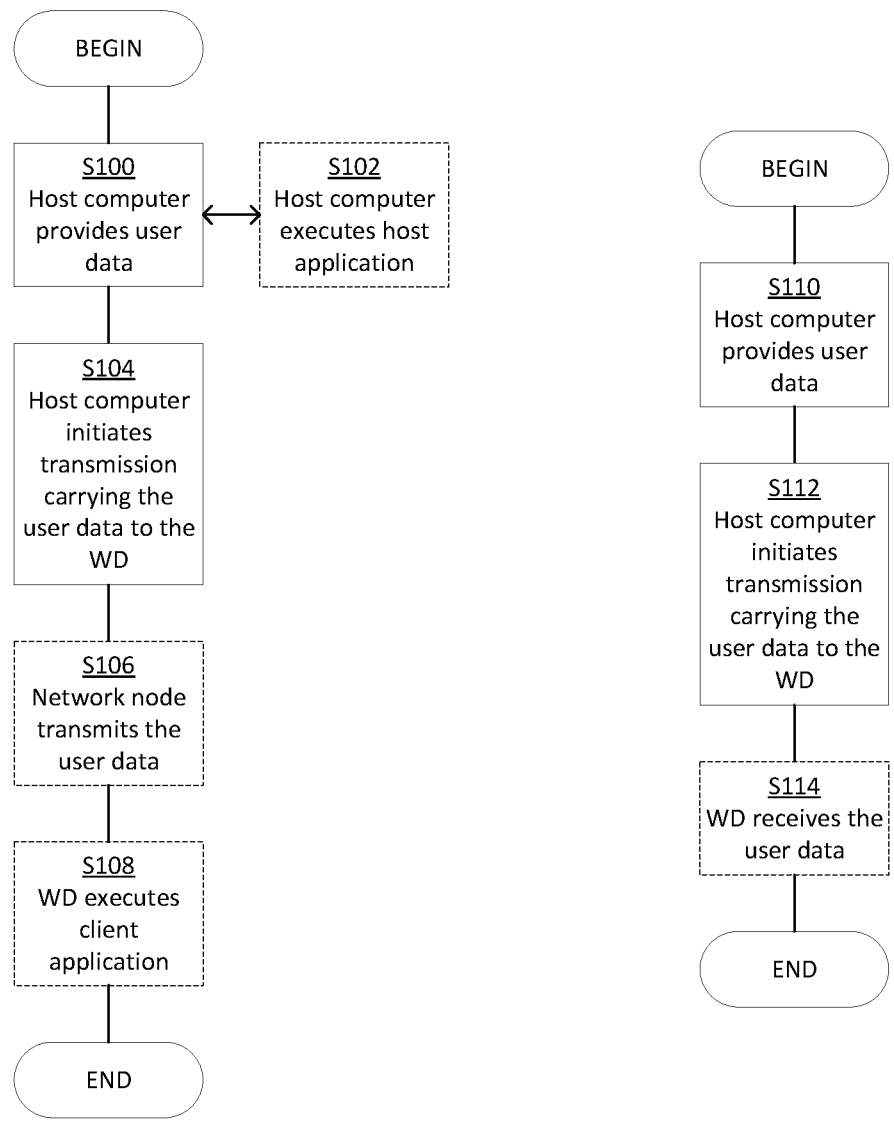
FIG. 6 illustrates example methods implemented in a communication system including a host computer, a base station and a user equipment in accordance with some embodiments.
FIG. 7 illustrates example methods implemented in a communication system including a host computer, a base station and a user equipment in accordance with some embodiments.

FIG. 6 is a flowchart illustrating a method implemented in a communication system, in accordance with one embodiment. The communication system includes a host computer 144, a network node 12 and a WD 14 which may be those described with reference to FIGS. 4 and 5. For simplicity of the present disclosure, only drawing references to FIG. 6 will be included in this section. In step S100, the host computer 144 provides user data. In substep S102 (which may be optional) of step S100, the host computer 144 provides the user data by executing a host application 164. In step S104, the host computer 144 initiates a transmission carrying the user data to the WD 14. In step S106 (which may be optional), the network node 12 transmits to the WD 14 the user data which was carried in the transmission that the host computer 144 initiated, in accordance with the teachings of the embodiments described throughout this disclosure. In step S108 (which may also be optional), the WD 14 executes a client application 188 associated with the host application 164 executed by the host computer 144.

FIG. 7 is a flowchart illustrating a method implemented in a communication system, in accordance with one embodiment. The communication system includes a host computer 144, a network node 12 and a WD 14 which may be those described with reference to FIGS. 4 and 5. For simplicity of the present disclosure, only drawing references to FIG. 7 will be included in this section. In step S110 of the method, the host computer 144 provides user data. In an optional substep (not shown) the host computer 144 provides the user data by executing a host application 164. In step S112, the host computer 144 initiates a transmission carrying the user data to the WD 14. The transmission may pass via the network node 12, in accordance with the teachings of the embodiments described throughout this disclosure. In step S114 (which may be optional), the WD 14 receives the user data carried in the transmission.

Figures 8, 9:
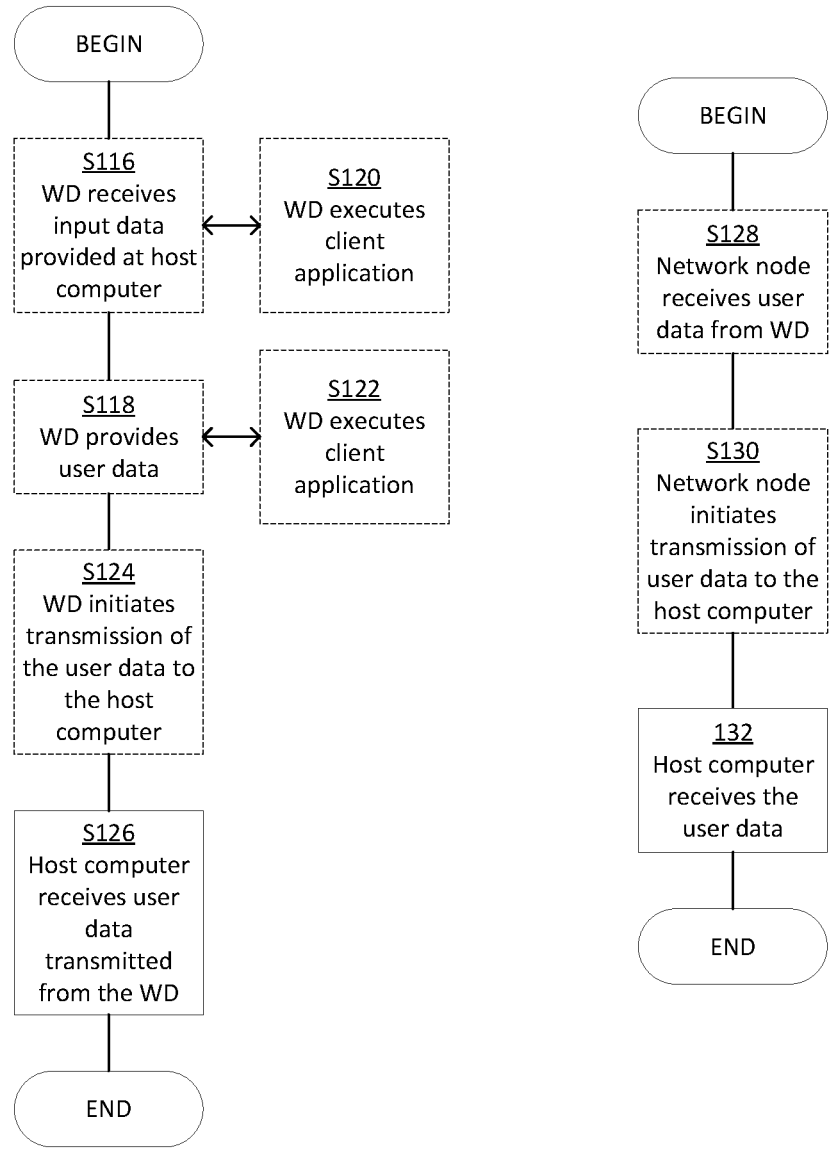
FIG. 8 illustrates example methods implemented in a communication system including a host computer, a base station and a user equipment in accordance with some embodiments.
FIG. 9. illustrates example methods implemented in a communication system including a host computer, a base station and a user equipment in accordance with some embodiments.

FIG. 8 is a flowchart illustrating a method implemented in a communication system, in accordance with one embodiment. The communication system includes a host computer 144, a network node 12 and a WD 14 which may be those described with reference to FIGS. 4 and 5. For simplicity of the present disclosure, only drawing references to FIG. 8 will be included in this section. In step S116 (which may be optional), the WD 14 receives input data provided by the host computer 144. Additionally or alternatively, in step S118, the WD 14 provides user data. In substep S120 (which may be optional) of step S118, the WD 14 provides the user data by executing a client application 188. In substep S122 (which may be optional) of step S116, the WD 14 executes a client application 188 which provides the user data in reaction to the received input data provided by the host computer 144. In providing the user data, the executed client application 188 may further consider user input received from the user. Regardless of the specific manner in which the user data was provided, the WD 14 initiates, in substep S124 (which may be optional), transmission of the user data to the host computer 144. In step S126 of the method, the host computer 144 receives the user data transmitted from the WD 14, in accordance with the teachings of the embodiments described throughout this disclosure.

FIG. 9 is a flowchart illustrating a method implemented in a communication system, in accordance with one embodiment. The communication system includes a host computer 144, a network node 12 and a WD 14 which may be those described with reference to FIGS. 4 and 5. For simplicity of the present disclosure, only drawing references to FIG. 9 will be included in this section. In step S128 (which may be optional), in accordance with the teachings of the embodiments described throughout this disclosure, the network node 12 receives user data from the WD 14. In step S130 (which may be optional), the network node 12 initiates transmission of the received user data to the host computer 144. In step S132 (which may be optional), the host computer 144 receives the user data carried in the transmission initiated by the network node 12.

The term unit may have conventional meaning in the field of electronics, electrical devices and/or electronic devices and may include, for example, electrical and/or electronic circuitry, devices, modules, processors, memories, logic solid state and/or discrete devices, computer programs or instructions for carrying out respective tasks, procedures, computations, outputs, and/or displaying functions, and so on, as such as those that are described herein.

Note that although terminology from one particular wireless system, such as, for example, 3GPP LTE and/or New Radio (NR), may be used in this disclosure, this should not be seen as limiting the scope of the disclosure to only the aforementioned system. Other wireless systems, including without limitation Wide Band Code Division Multiple Access (WCDMA), Worldwide Interoperability for Microwave Access (WiMax), Ultra Mobile Broadband (UMB) and Global System for Mobile Communications (GSM), may also benefit from exploiting the ideas covered within this disclosure.

Note further, that functions described herein as being performed by a wireless device or a network node may be distributed over a plurality of wireless devices and/or network nodes. In other words, it is contemplated that the functions of the network node and wireless device described herein are not limited to performance by a single physical device and, in fact, can be distributed among several physical devices.

Unless otherwise defined, all terms (including technical and scientific terms) used herein have the same meaning as commonly understood by one of ordinary skill in the art to which this disclosure belongs. It will be further understood that terms used herein should be interpreted as having a meaning that is consistent with their meaning in the context of this specification and the relevant art and will not be interpreted in an idealized or overly formal sense unless expressly so defined herein.

Figure 10:
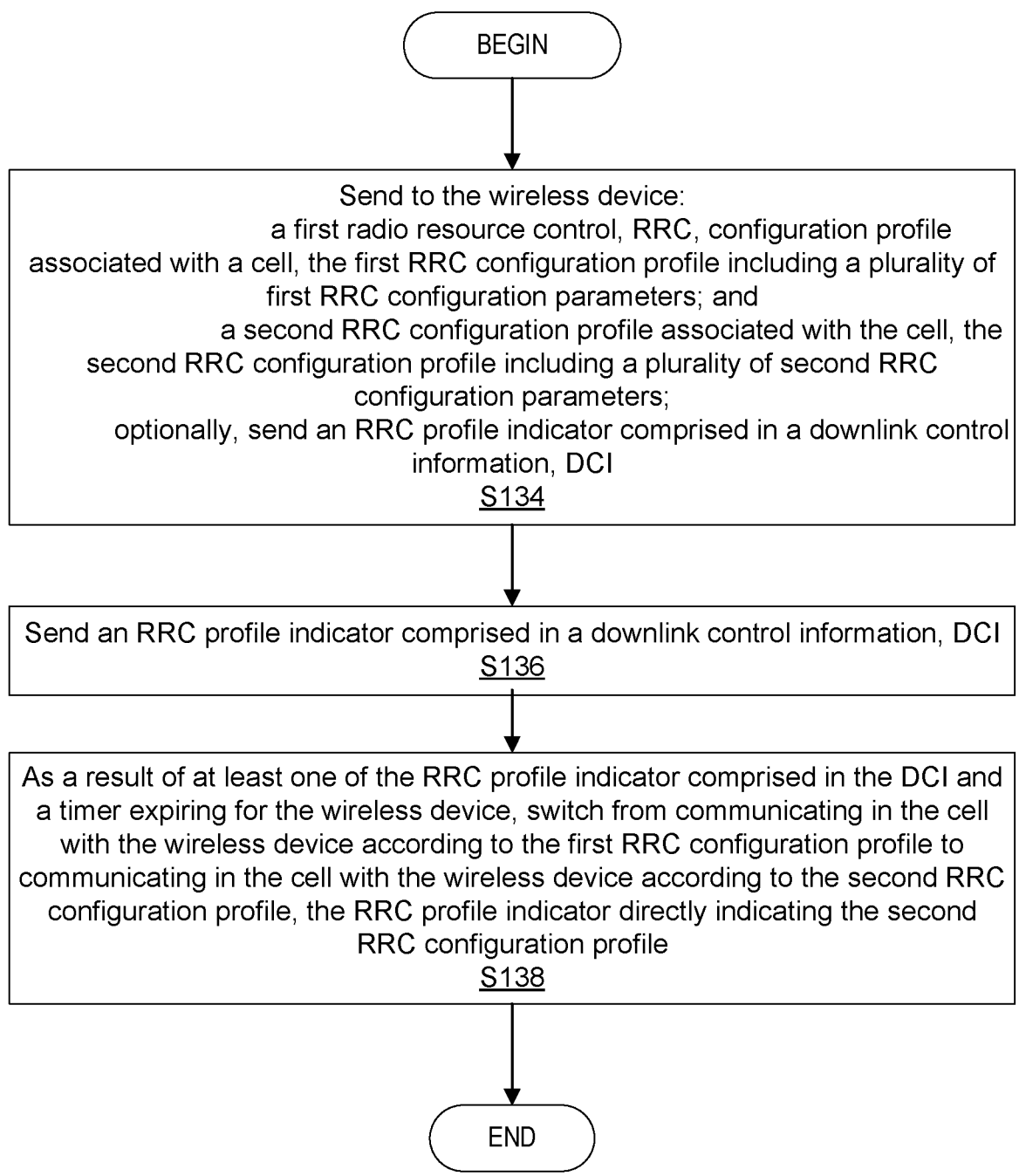
FIG. 10 is a flowchart of an example method for a network node according to one embodiment of the present disclosure.

FIG. 10 is a flowchart of an example process in a network node 12 according to some embodiments of the present disclosure. One or more Blocks and/or functions and/or methods performed by the network node 12 may be performed by one or more elements of network node 12 such as by processing circuitry 16, memory such as readable medium 18, interface 20, processing circuitry 178, communication interface 170, etc. or any other hardware in a network node 12 according to the example method. The example method includes sending (Block S134), such as by one or more of processing circuitry 16, memory such as readable medium 18, interface 20, processing circuitry 178, communication interface 170, etc., to the wireless device 14: a first radio resource control, RRC, configuration profile associated with a cell, the first RRC configuration profile including a plurality of first RRC configuration parameters; and a second RRC configuration profile associated with the cell, the second RRC configuration profile including a plurality of second RRC configuration parameters. The method includes optionally, sending (Block S136), such as by one or more of processing circuitry 16, memory such as readable medium 18, interface 20, processing circuitry 178, communication interface 170, etc., an RRC profile indicator comprised in a downlink control information, DCI. The method includes as a result of at least one of the RRC profile indicator comprised in the DCI and a timer expiring for the wireless device, switching (Block S138), such as by one or more of processing circuitry 16, memory such as readable medium 18, interface 20, processing circuitry 178, communication interface 170, etc., from communicating in the cell with the wireless device according to the first RRC configuration profile to communicating in the cell with the wireless device according to the second RRC configuration profile, the RRC profile indicator directly indicating the second RRC configuration profile.

In some embodiments, the RRC profile indicator is comprised in at least one field in the DCI, and a value of the RRC profile indicator maps to one of a plurality of pre-configured RRC configuration profiles. In some embodiments, the first and second RRC configuration profiles are grouped into a first RRC configuration profile group, and each RRC configuration profile in the first RRC configuration profile group shares a set of common RRC configuration parameter values. In some embodiments, the set of common RRC configuration parameter values shared by each RRC configuration profile in the first RRC configuration profile group includes at least one same radio processing chain parameter value, the at least one same radio processing chain parameter value includes at least one of a same bandwidth, a same frequency location, a same numerology, a same subcarrier spacing and a same cyclic prefix length.

In some embodiments, the method further includes using, such as by one or more of processing circuitry 16, memory such as readable medium 18, interface 20, processing circuitry 178, communication interface 170, etc., a radio processing chain that is tuned to communicate in the cell according to the first RRC configuration profile. In some embodiments, the switching comprises switching, such as by one or more of processing circuitry 16, memory such as readable medium 18, interface 20, processing circuitry 178, communication interface 170, etc., from communicating in the cell according to the first RRC configuration profile to communicating in the cell according to the second RRC configuration profile without re-tuning the radio processing chain.

In some embodiments, the first RRC configuration profile is grouped into a first RRC configuration profile group with at least one other RRC configuration profile, and the second RRC configuration profile is grouped into a second RRC configuration profile group with at least one other RRC configuration profile; each RRC configuration profile in the first RRC configuration profile group share a first set of common RRC configuration parameter values; and each RRC configuration profile in the second RRC configuration profile group share a second set of common RRC configuration parameter values, the first set of common RRC configuration parameter values being different from the second set of common RRC configuration parameter values.

In some embodiments, each of the first and second set of common RRC configuration parameter values includes at least one same radio processing chain parameter value, the at least one same radio processing chain parameter value includes at least one of a same bandwidth, a same frequency location, a same numerology, a same subcarrier spacing and a same cyclic prefix length as each of the at least one other RRC configuration profile in the respective first and second RRC configuration profile group. In some embodiments, the method further includes using, such as by one or more of processing circuitry 16, memory such as readable medium 18, interface 20, processing circuitry 178, communication interface 170, etc., a radio processing chain that is tuned to communicate in the cell according to the first RRC configuration profile. In some embodiments, switching comprises, as a result of at least one of the RRC profile indicator comprised in the DCI and a timer expiring for the wireless device; re-tuning the radio processing chain according to the second RRC configuration profile when the second RRC configuration profile and the first RRC configuration profile belong to different RRC configuration profile groups; and switching from communicating in the cell according to the first RRC configuration profile to communicating in the cell according to the second RRC configuration profile without re-tuning the radio processing chain when the second RRC configuration profile and the first RRC configuration profile belong to a same RRC configuration profile group.

In some embodiments, switching comprises, as a result of the RRC profile indicator comprised in the DCI, switching, such as by one or more of processing circuitry 16, memory such as readable medium 18, interface 20, processing circuitry 178, communication interface 170, etc., from communicating in the cell according to a first uplink waveform indicated in the first RRC configuration profile to communicating in the cell according to a second uplink waveform indicated in the second RRC configuration profile, the second uplink waveform being different from the first uplink waveform. In some embodiments, the first uplink waveform is a cyclic prefix orthogonal frequency division multiplexing, CP-OFDM, waveform and the second uplink waveform is a discrete Fourier Transform spread orthogonal frequency division multiplexing, DFT-S-OFDM, waveform.

In some embodiments, switching comprises, as a result of the RRC profile indicator comprised in the DCI, switching, such as by one or more of processing circuitry 16, memory such as readable medium 18, interface 20, processing circuitry 178, communication interface 170, etc., from communicating in the cell according to a first quadrature amplitude modulation, QAM, table indicated in the first RRC configuration profile to communicating in the cell according to a second QAM table indicated in the second RRC configuration profile, the second QAM table being different from the first QAM table.

In some embodiments, switching comprises, as a result of the RRC profile indicator comprised in the DCI, switching, such as by one or more of processing circuitry 16, memory such as readable medium 18, interface 20, processing circuitry 178, communication interface 170, etc., from communicating in the cell according to a first periodicity for at least one periodic resource indicated in the first RRC configuration profile to communicating in the cell according to a second periodicity for the at least one periodic resource indicated in the second RRC configuration profile, the second periodicity being different from the first periodicity.

In some embodiments, the at least one periodic resource includes at least one periodic sounding reference signal, SRS, resource. In some embodiments, the first RRC configuration profile is associated with a first bandwidth part, BWP, and the second RRC configuration profile is associated with a second BWP; and switching comprises, as a result of the at least one of the RRC profile indicator comprised in the DCI and the timer expiring, switching, such as by one or more of processing circuitry 16, memory such as readable medium 18, interface 20, processing circuitry 178, communication interface 170, etc., communicating in the cell on the first BWP according to the first RRC configuration profile to communicating in the cell on the second BWP according to the second RRC configuration profile.

In some embodiments, the method further includes at least one of sending the first and second RRC configuration profiles via RRC signaling; each of the plurality of first and second RRC configuration parameters configures at least one of a physical channel, a physical signal and a bandwidth part for the wireless device, WD; and each of the first and second RRC configuration profiles is associated with a corresponding pre-determined WD characteristic, the WD characteristic including at least one of a location of the WD relative to a center of the cell, a power characteristic of the WD, a radio environment of the WD, a number of multiple-input multiple-output, MIMO, layers being used by the WD, a speed of the WD and a latency requirement for the WD.

Figure 11:
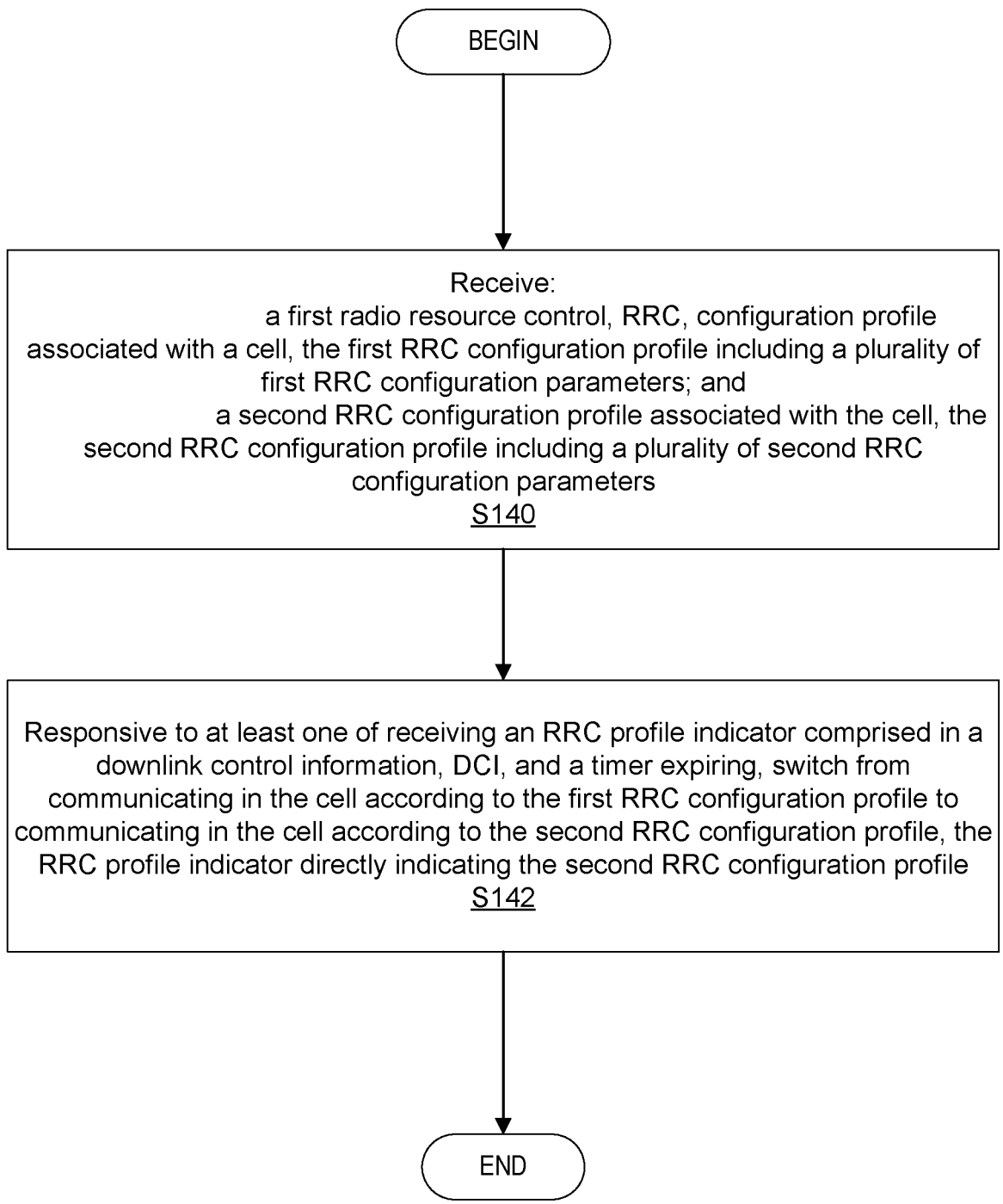
FIG. 11 is a flowchart of an example method for a wireless device according to one embodiment of the present disclosure.

FIG. 11 is a flowchart of an example process in a wireless device 14 according to some embodiments of the present disclosure. One or more Blocks and/or functions and/or methods performed by WD 14 may be performed by one or more elements of WD 14 such as by processing circuitry 46, memory such as readable medium 48, interface 44, processing circuitry 186, radio interface 184, or any other hardware in a WD 14, etc. The example method includes receiving (Block S140), such as via one or more of processing circuitry 46, memory such as readable medium 48, interface 44, processing circuitry 186, radio interface 184, etc., a first radio resource control, RRC, configuration profile associated with a cell, the first RRC configuration profile including a plurality of first RRC configuration parameters; and a second RRC configuration profile associated with the cell, the second RRC configuration profile including a plurality of second RRC configuration parameters. The method includes (Block S142), such as via one or more of processing circuitry 46, memory such as readable medium 48, interface 44, processing circuitry 186, radio interface 184, etc., responsive to at least one of receiving an RRC profile indicator comprised in a downlink control information, DCI, and a timer expiring, switching from communicating in the cell according to the first RRC configuration profile to communicating in the cell according to the second RRC configuration profile, the RRC profile indicator directly indicating the second RRC configuration profile.

In some embodiments, the RRC profile indicator is comprised in at least one field in the DCI, and a value of the RRC profile indicator maps to one of a plurality of pre-configured RRC configuration profiles. In some embodiments, the first and second RRC configuration profiles are grouped into a first RRC configuration profile group, and each RRC configuration profile in the first RRC configuration profile group shares a set of common RRC configuration parameter values. In some embodiments, the set of common RRC configuration parameter values shared by each RRC configuration profile in the first RRC configuration profile group includes at least one same radio processing chain parameter value, the at least one same radio processing chain parameter value includes at least one of a same bandwidth, a same frequency location, a same numerology, a same subcarrier spacing and a same cyclic prefix length.

In some embodiments, the method further includes using, such as via one or more of processing circuitry 46, memory such as readable medium 48, interface 44, processing circuitry 186, radio interface 184, etc., a radio processing chain that is tuned to communicate in the cell according to the first RRC configuration profile; and switching comprises switching from communicating in the cell according to the first RRC configuration profile to communicating in the cell according to the second RRC configuration profile without re-tuning the radio processing chain.

In some embodiments, the first RRC configuration profile is grouped into a first RRC configuration profile group with at least one other RRC configuration profile, and the second RRC configuration profile is grouped into a second RRC configuration profile group with at least one other RRC configuration profile; each RRC configuration profile in the first RRC configuration profile group share a first set of common RRC configuration parameter values; and each RRC configuration profile in the second RRC configuration profile group share a second set of common RRC configuration parameter values, the first set of common RRC configuration parameter values being different from the second set of common RRC configuration parameter values.

In some embodiments, each of the first and second set of common RRC configuration parameter values includes at least one same radio processing chain parameter value, the at least one same radio processing chain parameter value includes at least one of a same bandwidth, a same frequency location, a same numerology, a same subcarrier spacing and a same cyclic prefix length as each of the at least one other RRC configuration profile in the respective first and second RRC configuration profile group. In some embodiments, the method further includes using, such as via one or more of processing circuitry 46, memory such as readable medium 48, interface 44, processing circuitry 186, radio interface 184, etc., a radio processing chain that is tuned to communicate in the cell according to the first RRC configuration profile.

In some embodiments, switching includes responsive to the at least one of the receiving the RRC profile indicator comprised in the DCI and the timer expiring: re-tuning, such as via one or more of processing circuitry 46, memory such as readable medium 48, interface 44, processing circuitry 186, radio interface 184, etc., the radio processing chain according to the second RRC configuration profile when the second RRC configuration profile and the first RRC configuration profile belong to different RRC configuration profile groups; and switching from communicating in the cell according to the first RRC configuration profile to communicating in the cell according to the second RRC configuration profile without re-tuning the radio processing chain when the second RRC configuration profile and the first RRC configuration profile belong to a same RRC configuration profile group.

In some embodiments, switching includes responsive to receiving the RRC profile indicator comprised in the DCI, switching, such as via one or more of processing circuitry 46, memory such as readable medium 48, interface 44, processing circuitry 186, radio interface 184, etc., from communicating in the cell according to a first uplink waveform indicated in the first RRC configuration profile to communicating in the cell according to a second uplink waveform indicated in the second RRC configuration profile, the second uplink waveform being different from the first uplink waveform.

In some embodiments, the first uplink waveform is a cyclic prefix orthogonal frequency division multiplexing, CP-OFDM, waveform and the second uplink waveform is a discrete Fourier Transform spread orthogonal frequency division multiplexing, DFT-S-OFDM, waveform. In some embodiments, switching includes responsive to receiving the RRC profile indicator comprised in the DCI, switching, such as via one or more of processing circuitry 46, memory such as readable medium 48, interface 44, processing circuitry 186, radio interface 184, etc., from communicating in the cell according to a first quadrature amplitude modulation, QAM, table indicated in the first RRC configuration profile to communicating in the cell according to a second QAM table indicated in the second RRC configuration profile, the second QAM table being different from the first QAM table.

In some embodiments, switching includes responsive to receiving the RRC profile indicator comprised in the DCI, switching, such as via one or more of processing circuitry 46, memory such as readable medium 48, interface 44, processing circuitry 186, radio interface 184, etc., from communicating in the cell according to a first periodicity for at least one periodic resource indicated in the first RRC configuration profile to communicating in the cell according to a second periodicity for the at least one periodic resource indicated in the second RRC configuration profile, the second periodicity being different from the first periodicity. In some embodiments, the at least one periodic resource includes at least one periodic sounding reference signal, SRS, resource.

In some embodiments, the first RRC configuration profile is associated with a first bandwidth part, BWP, and the second RRC configuration profile is associated with a second BWP; and switching includes, responsive to the at least one of the receiving the RRC profile indicator comprised in the DCI and the timer expiring, switching, such as via one or more of processing circuitry 46, memory such as readable medium 48, interface 44, processing circuitry 186, radio interface 184, etc., communicating in the cell on the first BWP according to the first RRC configuration profile to communicating in the cell on the second BWP according to the second RRC configuration profile.

In some embodiments, at least one of: the first and second RRC configuration profiles are received via RRC signaling; each of the plurality of first and second RRC configuration parameters configures at least one of a physical channel, a physical signal and a bandwidth part for the wireless device, WD; and each of the first and second RRC configuration profiles is associated with a corresponding pre-determined WD characteristic, the WD characteristic including at least one of a location of the WD relative to a center of the cell, a power characteristic of the WD, a radio environment of the WD, a number of multiple-input multiple-output, MIMO, layers being used by the WD, a speed of the WD and a latency requirement for the WD.

Having described the general process flow of arrangements of the disclosure and having provided examples of hardware and software arrangements for implementing the processes and functions of the disclosure, the sections below provide details and examples of arrangements for semi-dynamic configuration in a mobile system, which may be implemented by the network node 12 and/or wireless device 14.

RRC Configuration in General—Introduce BWP Specific RRC Profile

Radio Resource Control (RRC) is responsible for handling Radio Access Network (RAN) related (RAN-related) control plane procedures including broadcast of system information, transmission of paging messages, connection management, mobility, measurement configuration/reporting, and handling WD 14 capabilities. Connection management includes establishing an RRC context by configuring the parameters necessary for communication between the device and the radio-access network. The [WD specific] RRC configured parameters can be [roughly] categorized into several categories:

Cell specific RRC configurations, e.g., TDD pattern;
RRC configurations across all BWPs, e.g., slot format indicator, number hybrid automatic repeat request (HARQ) processes for physical downlink shared channel (PDSCH);
BWP specific RRC configurations, e.g., BWP, physical downlink control channel (PDCCH), physical downlink shared channel (PDSCH), physical random access channel (PRACH), physical uplink control channel (PUCCH), physical uplink shared channel (PUSCH), sounding reference signal (SRS), etc.

Main parameters for data communication between the device (e.g., WD 14) and the network (e.g., NN 12) are contained in BWP specific RRC configuration which includes two parts: the first is the definition of BWP with its RF parameters (bandwidth, location in frequency domain, numerology, and cyclic prefix), and the second part are parameters for physical channels and signals associated with BWP. In some embodiments of this proposal, the first part is called BWP RF profile (BRFP), and the second part is called BWP specific RRC profile (BRP) per WD 14. (These terms BRFP, BRFPGs and BRP are merely description and may be referred to by other names). For each BWP RF profile (BRFP), there could be multiple BWP specific RRC parameter/configuration profiles (BRPs). One BRFP with one or more BRPs forms a BRFP Group (BRFPG). Multiple BRFPGs could be pre-stored at the network side. Each BWP configured to WD 14 is associated with one BRFP and one BRP. Multiple (up to 4 in 3GPP Rel-15 NR) BWPs could be configured to a WD 14 per serving cell, and BRPs associated with these BWPs could belong to the same BRFPG (same BRFP) or belong to different BRFPGs (different BRFPs). One or more active BWPs for a WD 14 (one active BWP for a WD 14 in 3GPP Rel-15).

BWP Specific RRC Profile (BRP) Design Principle

BRP is designed mainly for two purposes:

Adapt to different BWP RF profiles (BRFP). For example, parameters for physical channels and signals need to be aligned with the bandwidth (and or numerology, cyclic prefix) of BWP. This has been a main focus when BWP is introduced to NR for bandwidth related application (reduced device bandwidth capability, bandwidth adaptation for device power efficiency, etc.)

Figure 13:
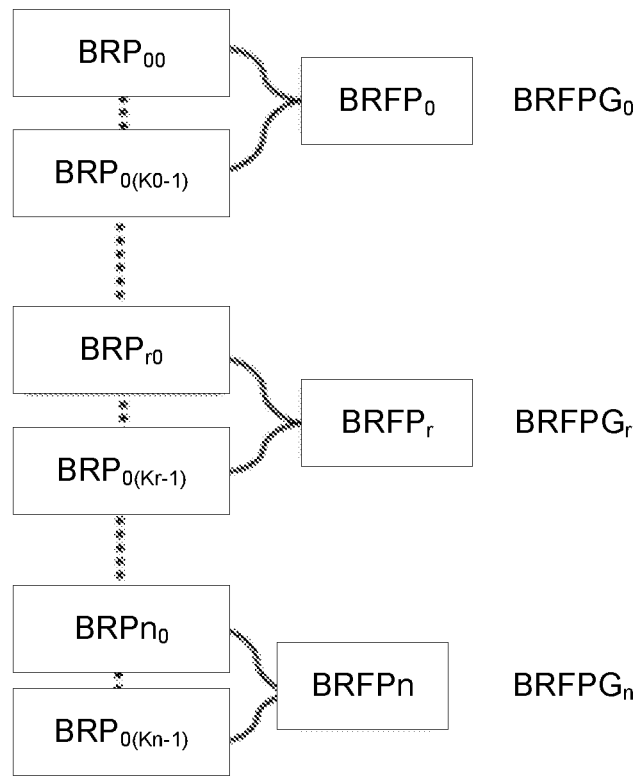
FIG. 13 illustrates an example structure of a BRFP group according to some embodiments.

Adapt to different radio link environments and/or network/device conditions with the same or different BRFP. FIG. 13 illustrates an example BRP to BRFP group (BRFPG) arrangement.

In some embodiments, certain parameters (e.g., QAM table, uplink waveform) can take only one value, among multiple options, per BWP. One value of the parameter might be the optimal choice for certain radio link environment, but not optimal for other radio link environment. As an example, there are two QAM tables for MBB traffic for downlink or uplink: 64QAM table and 256QAM table. The current specification allows only one QAM table to be RRC configured per BWP. Even for WD 14 supporting 256QAM, there is benefit of configuring 64QAM, with improved link adaptation through higher modulation and coding scheme (MCS) resolution, especially when WD 14 is at low signal-to-noise ratio (SNR) environment and low channel quality conditions. Since there is no DCI based QAM table switch mechanism, RRC reconfiguration is the only way of changing QAM table from one to another, but it is slow in the sense long RRC reconfiguration delay.

DCI/Timer Based BWP Switch for Fast BWP Specific RRC Profile (BRP) Change

A WD 14 can be configured with multiple BWPs per serving cell (e.g., 4 BWPs in DL and 4 BPWs in UL for 3GPP Release-15), each BWP has one BRP with corresponding BRFP. DCI/Timer based BWP switch provide a mechanism to change BRP together with corresponding BRFP, as well as to change BRP without BRFP change. Although it is not fully dynamic, DCI/Timer based BWP switch is much faster (~1-3 ms or faster) than RRC reconfiguration (>10-80 ms).

It should be understood that DCI-based BWP switch and timer-based BWP switch are two different BWP switch mechanisms. Some embodiments of the present disclosure may use one or the other as a BWP switch mechanism. For example, a for DCI-based BWP switch, a WD 14 may be configured with two or more BWPs with one being the active BWP, and the network informing the WD 14 to switch from one active BWP to another BWP based on the indicator (e.g., the RRC profile indicator) in the DCI message. On the other hand, for timer-based BWP switch, a WD 14 may be configured with two or more BWPs with one being the active BWP together with a timer. When the timer expires, the WD 14 switches from the active BWP to another one (e.g., default BWP). It should be understood that DCI-based BWP switch does not generally act together with timer-based BWP switch. In other words, the DCI and the timer expiring may be considered two different alternatives for triggering a BWP switch according to some embodiments of the present disclosure.

Since RRC context of all configured BWPs is known by both network and WD 14 and stored at both sides in RRC connected mode, there is no extra traffic for transferring related RRC messages after all related BWP are configured.

In one scenario, multiple BWPs are configured to WD 14 with different BRP with the same BRFP. Bandwidth part indicator field in downlink/uplink (DL/UL) DCI can indicate a BWP with appropriate BRP based on corresponding criteria. No bandwidth change/retuning related operation may be needed at both network node 12 and WD 14, and network node 12 may still apply the legacy scheduling scheme with the enhanced RRC configuration flexibility.

As an example, WD 14 can be configured with a BRP with CP-OFDM (one form of waveform) of one UL BWP, and a BRP with DFT-S-OFDM (another form of waveform) of another UL BWP. Both UL BWPs may have the same BRFP. As a WD 14 approaches cell edge, network node 12 can require WD 14 to change UL waveform from CP-OFDM to DFT-S-OFDM in a semi-dynamic manner by applying DCI based BWP switch.

Figure 12:
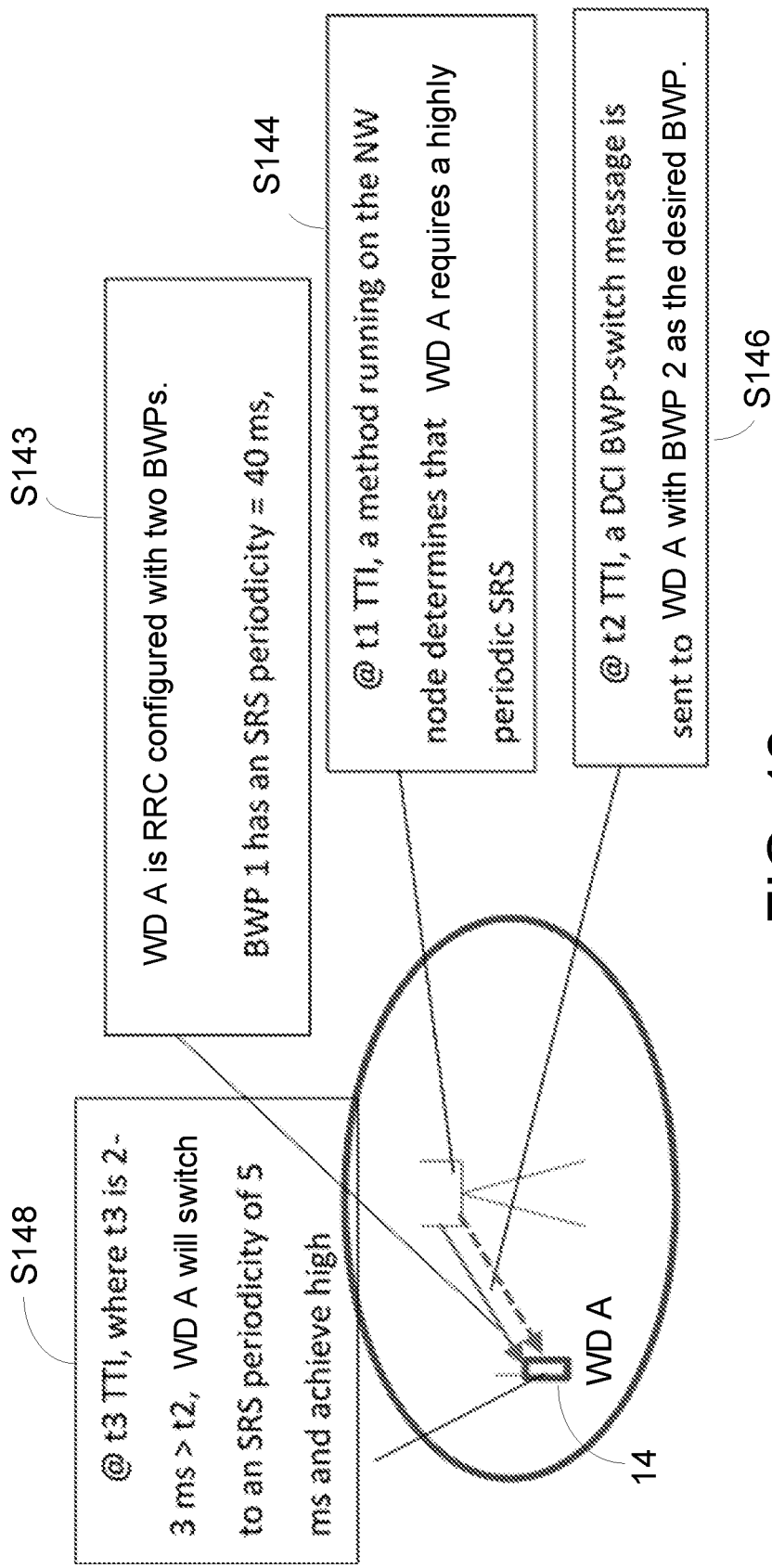
FIG. 12 illustrates an embodiment for Dynamic SRS Periodicity.

Another example is dynamic Sounding Reference Signal (SRS) allocation. An exemplary implementation of some embodiments of the present disclosure applied to this use-case may include the following steps, as shown in FIG. 12, for example:

1. In step S143, two or more BWPs with different SRS allocation periodicities/configurations may be RRC configured to one or more WDs 14, which can be referred to as two BRPs.
2. In step S144, an adaptive SRS allocation strategy may be implemented in a control unit in a network node 12. At a t1 transmission time interval (TTI), the control unit (e.g., NN 12) determines that the SRS allocation to a WD 14 A should be changed.
3. In step S146, the BWP-ID that has the desired SRS allocation scheme may be identified by the control unit in the network node 12. A DCI BWP-switch message is then sent to the WD 14, indicating to switch to the determined BWP-ID.
4. In step S148, upon receiving the DCI-BWP-switch message, the WD 14 switches its BWP and follows the desired SRS allocation scheme. This may happen in a timely fashion with no RRC reconfiguration messages.

BRP Optimization for Use Cases

In some embodiments, a BRP contains a set of parameters which are optimized for certain use case(s) and or at certain scenarios, and the fast (DCI-based) BWP switch can bring, almost instantaneously, the benefit the favored set of parameters for a changing situation/environment. Take UL waveform as an example, DFT-S-OFDM is usually applied to power limited WD 14, especially at cell edge, for improving power-amplifier efficiency and hence the overall network throughput. Thus, when WD 14 is identified as power limited, other parameters, such as QAM table, maximum # of multiple-input multiple-output (MIMO) layers, etc., can also be configured together with DFT-S-OFDM as a full package of BRP. In Rel-15, UL waveform is only semi-statically configured, and the change is to be done through RRC re-configuration which is slow. On the other hand, for WD 14 in the radio environment of a single MIMO layer, DFT-S-OFDM may provide better link performance than CP-OFDM. Although MIMO-layer (rank) may be a fast adaptive variable through link adaptation procedure, the UL waveform may not be able to be changed in the same pace accordingly.

BRP List for RRM at Network

Network (e.g., network node 12) can design and keep a list of BRPs, as part of RRM, for a WD 14, for a group of WDs 14 and/or for all connected WDs 14. Each BRP of the list contains parameters optimized/suitable for a particular use case. The use cases could be cell center WD 14, cell edge WD 14, high speed WD 14, slow speed WD 14, etc., or combination of these use cases like high speed WD 14 at cell center, slow speed WD 14 at cell center, etc. Certain parameters in the BRP are common to any BRFP, other parameters in the BRP need to be adjusted to different BRFP.

Illustration of Multiple Level of Configuration Mechanism

Figure 14:
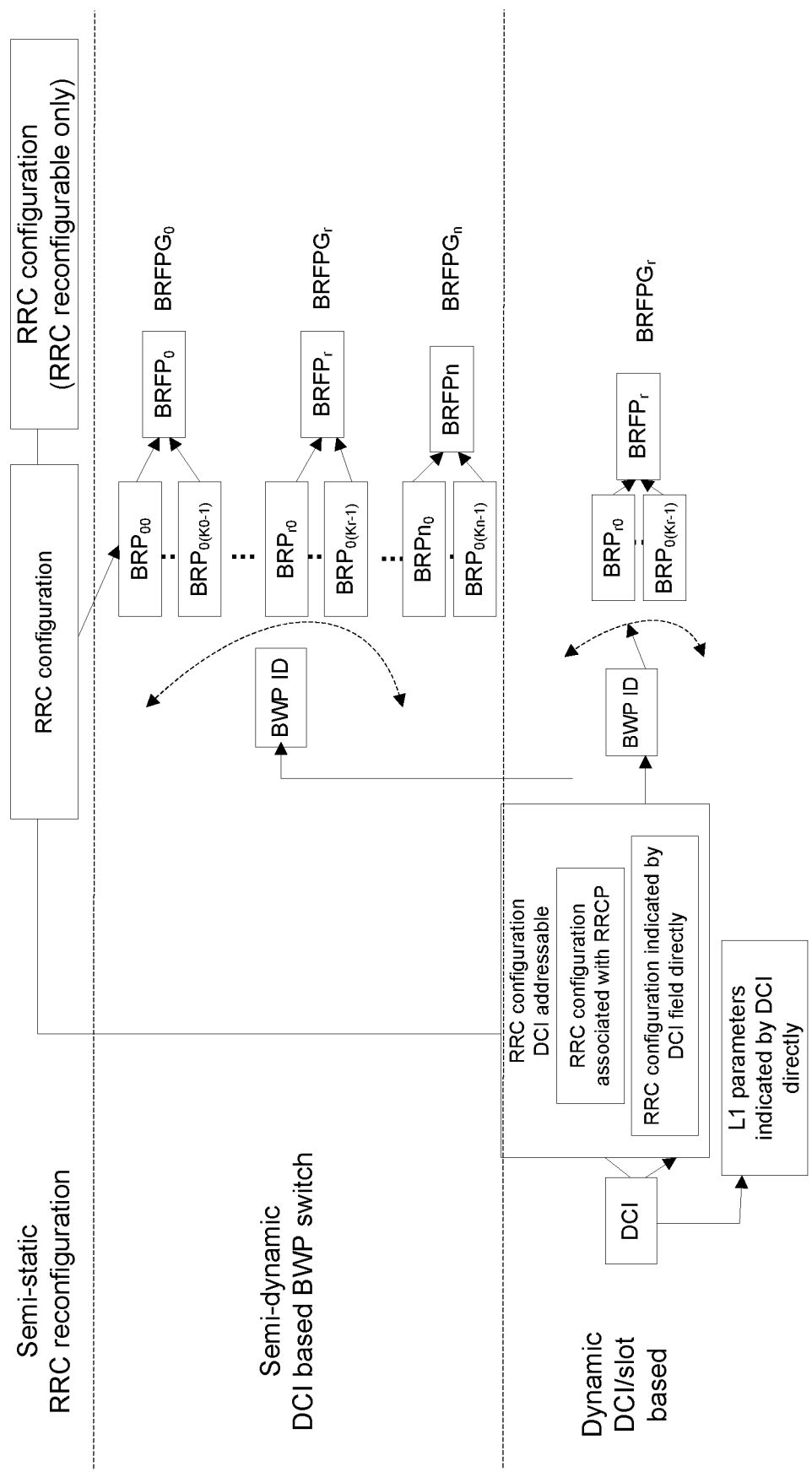
FIG. 14 illustrates an example of multiple levels of a configuration mechanism according to some embodiments.

In the legacy/traditional cellular systems, only semi-static RRC reconfiguration and dynamic DCI indication are utilized for radio resource management and mobility management (the top and bottom-left part in FIG. 14). With the introduction of BWP and DCI-based BWP switch in NR, a semi-dynamic level of configuration/indication (the middle part in FIG. 14) can be used for use cases which prefer faster RRC configuration change but related DCI indication fields are not implemented. BWP specific RRC configuration can be grouped based on BRFP, where each BRFP group contains the same BWP RF profile (BRFP) with one or more BWP RRC profiles (BRPs). On the other hand, DCI fields are designed in the way the total payload of DCI is limited for efficient and reliable transmission of DCI through PDCCH. With BWP indication field of a few bits, one BWP RRC configuration profile (BRP) may include multiple parameters to be changed (instead of, one DCI field for each parameter).

As an extension of the design principle, 'BWP RRC configuration profile (BRP)' may not necessarily be associated to a BWP (with RF definition by its nature). BRP could be abstracted to more generally be just as a RRC configuration profile and this profile may be DCI addressable.

As another extension, DCI based BWP switch could be also dynamic (bottom-right part of FIG. 14), in addition to semi-dynamic. The semi-dynamic nature of the current DCI-based/timer-based BWP switch is mainly due to RF nature of BWP. When WD 14 switches BWP from one BWP to another with different bandwidths and or frequency locations (different BRFP), WD 14 needs to re-tune the radio processing chain to adapt. By decoupling BRP from BRFP, switching among BRP in the same BRFP group may be faster than switching among different BRFP groups, and in some cases may be as fast as DCI-based parameter dynamic changes.

Flow Chart of DCI Based BWP

Figure 15:
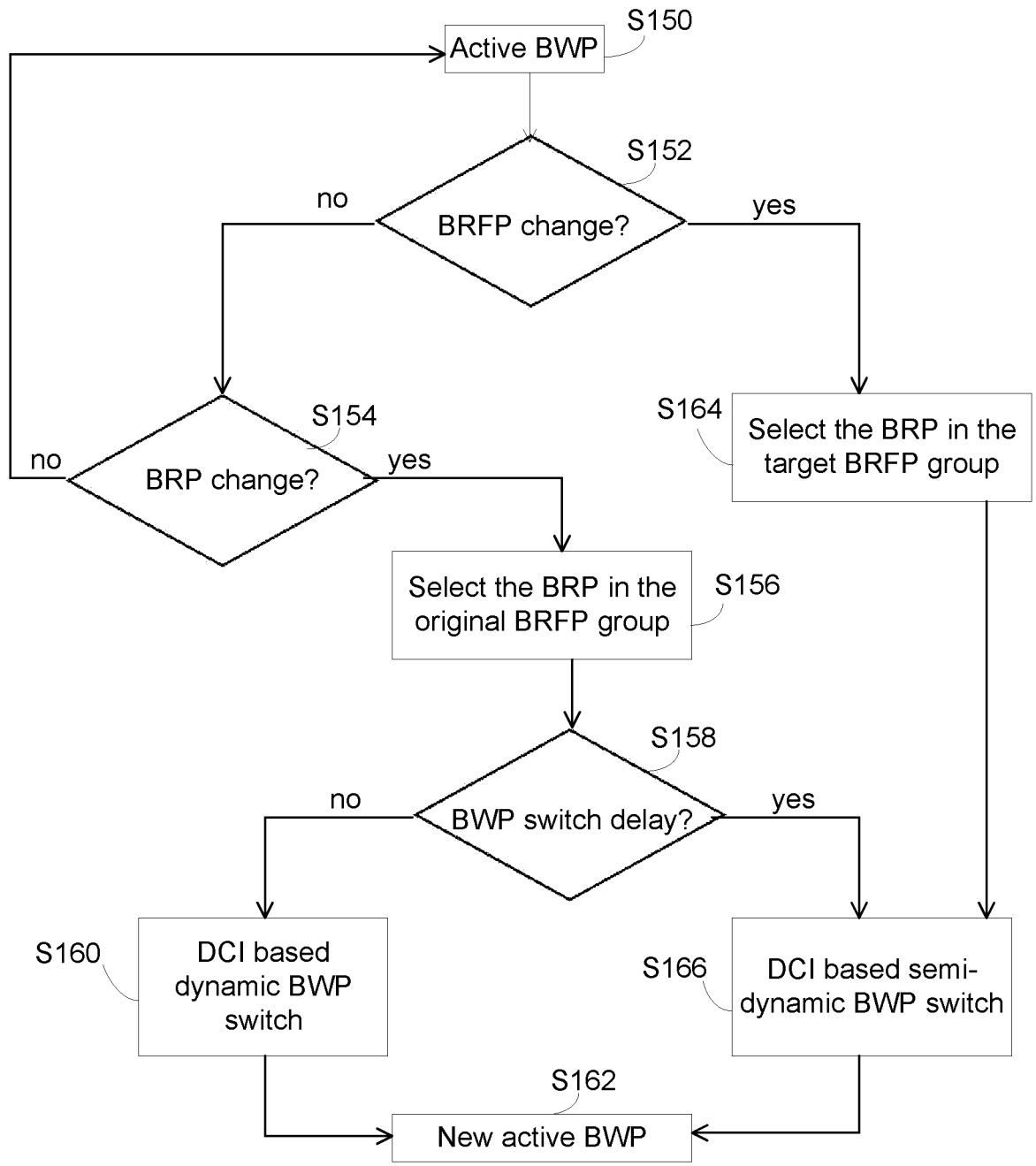
FIG. 15 illustrates an example flow chart of DCI-based BWP switch according to some embodiments.

FIG. 15 illustrates an example procedure of DCI-based BWP switch, where BWP switch happens either in the different BRFP group, or in the same BRFP group. The example method includes, in step S150, the WD 14 is operating in an active BWP. In step S152, the WD 14 determines whether there is a BRFP change. If there is a BRFP change, the method proceeds to step S154, where the WD 14 determines whether there is a BRP change. If there is no BRP change, the process continues to operate in the original active BWP. On the other hand, if there is a BRP change, the process proceeds to step S156, where the WD 14 selects the BRP in the original BRFP group. In step S158, BWP switch delay may be determined. If there is no BWP switch delay, the process proceeds to step S160, where the WD 14 performs a DCI based dynamic BWP switch. In step S162, the WD 14 operates in the new active BWP. If there is a BRFP change, in step S164, the WD 14 selects the BRP in the target BRFP group. The process then proceeds to step S166, where the WD 14 performs a DCI based semi-dynamic BWP switch and in step S162, the WD 14 operates in the new active BWP.

Configuration/Indication of Different Time Scale

Figure 16:
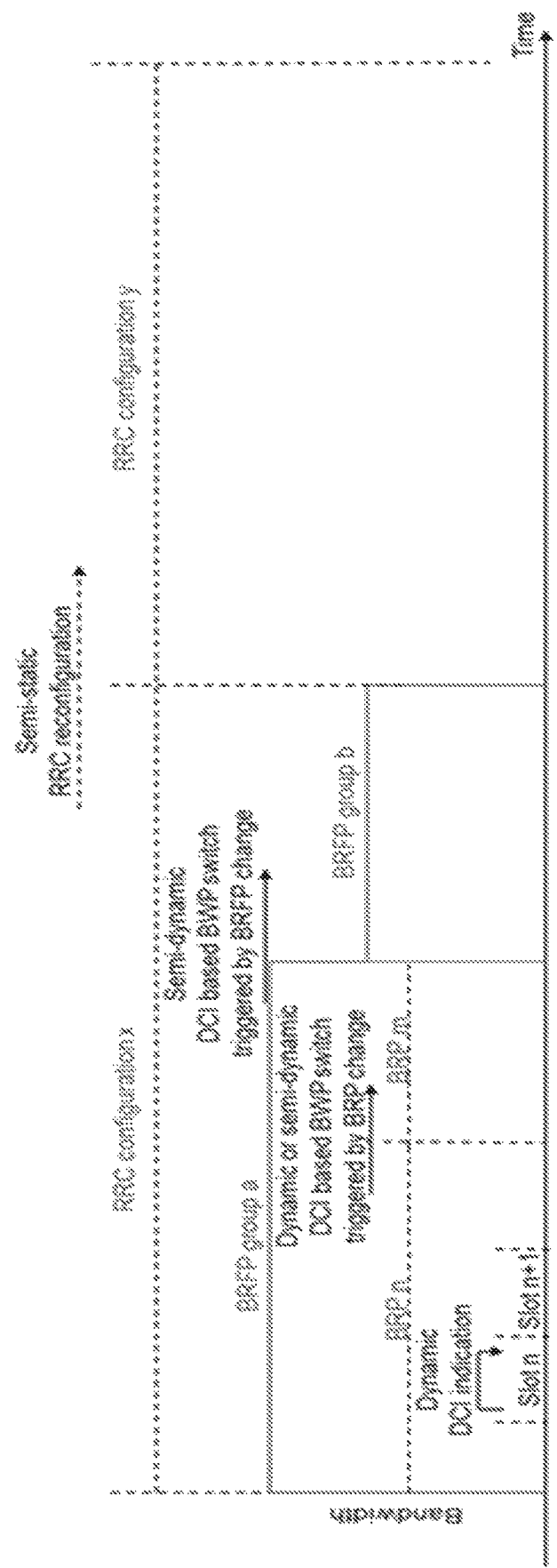
FIG. 16 illustrates an example of time scales of multiple levels of configuration/indication according to some embodiments.

FIG. 16 illustrates time scales of multiple levels of configuration/indication. Dynamic assignment/grant by DCI indication fields is carried on a per slot, or multiple slot basis. Some of these DCI fields point to RRC configured parameter options (DCI addressable RRC configuration). DCI based BWP switch is carried in a semi-dynamic manner or dynamic manner. BWP switch can happen among BRFP groups (with BRFP change), or within a BRFP group. For BWP switch among BRFP groups, the typical case can be a bandwidth change (as illustrated in FIG. 16), or a numerology change, or a frequency location change, or a combination of these RF parameter changes. RF parameter change among BRFP groups could introduce longer BWP switch delay (between 1-3 ms) and more likely be semi-dynamic. For BWP switch within the same BRFP group, the typical case could a switch from one BRP suitable for one use case (e.g., cell center WD 14 with DFT-S-OFDM UL waveform and QAM64 table for improving cell coverage) to a BRP suitable for another use case (e.g., center WD 14 with CP-OFDM waveform and QAM256 table for improving cell throughput). As mentioned earlier, DCI based BWP switch can be dynamic or semi-dynamic if BRPs are in the same BRFP group.

Variations of BWP Specific RRC Profile (BRP) Adaptation

Timer Based BWP Switch

Although DCI-based BWP switching is mentioned in most of this disclosure, the general principle as described in the proposal also applies to timer-based BWP switch. Timer-based BWP switching has the similar/same BWP switch latency as DCI-based BWP switch, and can be treated a dynamic or semi-dynamic configuration/indication.

Configurable BWPs Vs. Configured BWP

The proposal scheme can be applied to two or more configured BWPs. Since multiple BRPs can be configured for the same BRFP group, the total number of configurable BWPs depends on the number scenarios which need different BWP configurations. Since only up to 4 BWPs can be configured to a WD 14 per serving cell in 3GPP Release-15 and the number may or may not be increased in the future release, there might be issue that the number of configurable BWPs as needed is more than max number of BWPs configured to a WD 14 per serving cell. To handle such scenario, a hybrid configuration scheme can be applied. Take FIG. 16 as an example, RRC configuration x and RRC configuration y are design together so as to cover more BWP configurations in different scenarios. For example, parameters (e.g., frequency hopping modes (intra-slot, or inter slot)) for less latency sensitive characteristics of the system could be semi-statically configured (e.g., RRC re-configuration), while parameters (e.g., UL waveform, QAM tables) more latency sensitive could be semi-dynamically configured. In some cases, latency sensitivity of the parameters could change based on the radio environment, so could the order of semi-static configuration and semi-dynamic configuration of the corresponding parameters.

Multiple Active DL/UL BWPs Per Serving Cell Per WD

Some embodiments can also be applied to multiple active DL/UL BWPs per serving cell for a WD 14, although 3GPP Release-15 only allows one active DL/UL BWP per serving cell per WD 14. Each active BWP can follow the same procedure as described in this this disclosure.

Network/Group Wise RRC Configuration Switch

In some scenarios, a BRP can be applied to a group of WDs 14 configured with the same BRFP (in the same BRFP group), and the BRP designed can be changed together for each of these WDs 14.

Generic Dynamic/Semi-Dynamic Configuration of Mobile System

Figure 17:
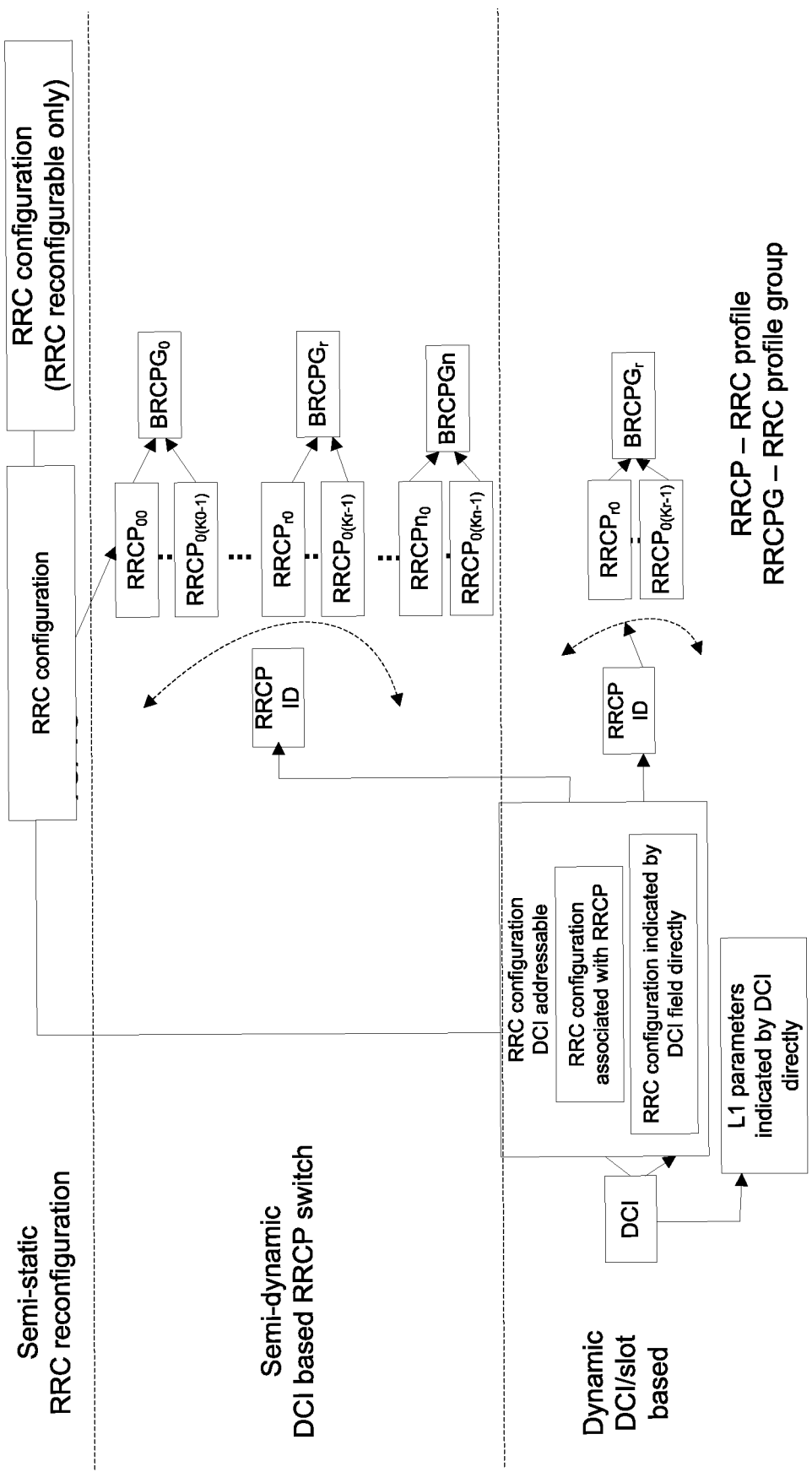
FIG. 17 illustrates an example of generic dynamic/semi-dynamic configuration according to some embodiments.

Some embodiments are not limited to BWP specific scenarios as described above. "BWP" can be treated as an abstraction, without RF characteristics, of a pure linkage between one or more DCI indicators and the corresponding RRC Profiles (RRCP), as illustrated in FIG. 17. The corresponding DCI indicator is named as RRC Profile (RRCP) indicator (ID) in FIG. 17, and RRCP ID is mapped to the value of RRC indicator. Each RRCP ID represents a pre-configured RRC profile. There could be multiple RRC Profile Groups (RRCPGs) of RRC profiles and RRCP ID could be coded to represent RRCP in a RRCPG. These more general (e.g., non-BWP specific) RRC configuration profiles can have more the flexibility of grouping RRC parameters per application or per scenario, without the constraint of the physical parameters associated with a BWP, e.g., bandwidth and may have variations of granularity.

Abbreviations

At least some of the following abbreviations may be used in this disclosure. If there is an inconsistency between abbreviations, preference should be given to how it is used above. If listed multiple times below, the first listing should be preferred over any subsequent listing(s).

1×RTT CDMA2000 1× Radio Transmission Technology
3GPP 3rd Generation Partnership Project
5G 5th Generation
ABS Almost Blank Subframe
ARQ Automatic Repeat Request
AWGN Additive White Gaussian Noise
BCCH Broadcast Control Channel
BCH Broadcast Channel
CA Carrier Aggregation
CC Carrier Component
CCCH SDU Common Control Channel SDU
CDMA Code Division Multiplexing Access
CGI Cell Global Identifier
CR Channel Impulse Response
CP Cyclic Prefix
CPICH Common Pilot Channel
CPICH Ec/No CPICH Received energy per chip divided by the power density in the band
CQI Channel Quality information
C-RNTI Cell RNTI
CSI Channel State Information
DCCH Dedicated Control Channel
DL Downlink
DM Demodulation
DMRS Demodulation Reference Signal
DRX Discontinuous Reception
DTX Discontinuous Transmission
DTCH Dedicated Traffic Channel
DUT Device Under Test
E-CID Enhanced Cell-ID (positioning method)
E-SMLC Evolved-Serving Mobile Location Centre
ECGI Evolved CGI
eNB E-UTRAN NodeB
ePDCCH enhanced Physical Downlink Control Channel
E-SMLC evolved Serving Mobile Location Center
E-UTRA Evolved UTRA
E-UTRAN Evolved UTRAN
FDD Frequency Division Duplex
FFS For Further Study
GERAN GSM EDGE Radio Access Network
gNB Base station in NR
GNSS Global Navigation Satellite System
GSM Global System for Mobile communication
HARQ Hybrid Automatic Repeat Request
HO Handover
HSPA High Speed Packet Access
HRPD High Rate Packet Data
LOS Line of Sight
LPP LTE Positioning Protocol
LTE Long-Term Evolution
MAC Medium Access Control
MBMS Multimedia Broadcast Multicast Services
MBSFN Multimedia Broadcast multicast service Single Frequency Network
MBSFN ABS MBSFN Almost Blank Subframe
MDT Minimization of Drive Tests
MIB Master Information Block
MME Mobility Management Entity
MSC Mobile Switching Center
NPDCCH Narrowband Physical Downlink Control Channel
NR New Radio
OCNG OFDMA Channel Noise Generator
OFDM Orthogonal Frequency Division Multiplexing
OFDMA Orthogonal Frequency Division Multiple Access
OSS Operations Support System
OTDOA Observed Time Difference of Arrival
O&M Operation and Maintenance
PBCH Physical Broadcast Channel
P-CCPCH Primary Common Control Physical Channel
PCell Primary Cell
PCFICH Physical Control Format Indicator Channel
PDCCH Physical Downlink Control Channel
PDCP Packet Data Convergence Protocol
PDP Profile Delay Profile
PDSCH Physical Downlink Shared Channel
PGW Packet Gateway
PHICH Physical Hybrid-ARQ Indicator Channel
PLMN Public Land Mobile Network
PMI Precoder Matrix Indicator
PRACH Physical Random Access Channel
PRS Positioning Reference Signal
PSS Primary Synchronization Signal
PUCCH Physical Uplink Control Channel
PUSCH Physical Uplink Shared Channel
RACH Random Access Channel
QAM Quadrature Amplitude Modulation
RAN Radio Access Network
RAT Radio Access Technology
RLC Radio Link Control
RLM Radio Link Management
RNC Radio Network Controller
RNTI Radio Network Temporary Identifier
RRC Radio Resource Control
RRM Radio Resource Management
RS Reference Signal
RSCP Received Signal Code Power
RSRP Reference Symbol Received Power OR Reference Signal Received Power
RSRQ Reference Signal Received Quality OR Reference Symbol Received Quality
RSSI Received Signal Strength Indicator
RSTD Reference Signal Time Difference
SCH Synchronization Channel
SCell Secondary Cell
SDAP Service Data Adaptation Protocol
SDU Service Data Unit
SFN System Frame Number SGW Serving Gateway
SI System Information
SIB System Information Block
SNR Signal to Noise Ratio
SON Self Optimized Network
SS Synchronization Signal
SSS Secondary Synchronization Signal
TDD Time Division Duplex
TDOA Time Difference of Arrival
TOA Time of Arrival
TSS Tertiary Synchronization Signal
TTI Transmission Time Interval
UE User Equipment
UL Uplink
UMTS Universal Mobile Telecommunication System
USIM Universal Subscriber Identity Module
UTDOA Uplink Time Difference of Arrival
UTRA Universal Terrestrial Radio Access
UTRAN Universal Terrestrial Radio Access Network
WCDMA Wide CDMA
WLAN Wide Local Area Network
BWP Bandwidth Parts
BRFP BWP RF Profile
BRP BWP specific RRC Profile
DCI Downlink Control Information
RRC Radio Resource Control
NR New Radio access technology
URLLC Ultra Reliability Low Latency Communication As will be appreciated by one of skill in the art, the concepts described herein may be embodied as a method, data processing system, and/or computer program product. Accordingly, the concepts described herein may take the form of an entirely hardware embodiment, an entirely software embodiment or an embodiment combining software and hardware aspects all generally referred to herein as a "circuit" or "module." Furthermore, the disclosure may take the form of a computer program product on a tangible computer usable storage medium having computer program code embodied in the medium that can be executed by a computer. Any suitable tangible computer readable medium may be utilized including hard disks, CD-ROMs, electronic storage devices, optical storage devices, or magnetic storage devices.

Some embodiments are described herein with reference to flowchart illustrations and/or block diagrams of methods, systems and computer program products. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable memory or storage medium that can direct a computer or other programmable data processing apparatus to function in a particular manner, such that the instructions stored in the computer readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks. It is to be understood that the functions/acts noted in the blocks may occur out of the order noted in the operational illustrations. For example, two blocks shown in succession may in fact be executed substantially concurrently or the blocks may sometimes be executed in the reverse order, depending upon the functionality/acts involved. Although some of the diagrams include arrows on communication paths to show a primary direction of communication, it is to be understood that communication may occur in the opposite direction to the depicted arrows.

Computer program code for carrying out operations of the concepts described herein may be written in an object oriented programming language such as Java® or C++. However, the computer program code for carrying out operations of the disclosure may also be written in conventional procedural programming languages, such as the "C" programming language. The program code may execute entirely on the user's computer, partly on the user's computer, as a stand-alone software package, partly on the user's computer and partly on a remote computer or entirely on the remote computer. In the latter scenario, the remote computer may be connected to the user's computer through a local area network (LAN) or a wide area network (WAN), or the connection may be made to an external computer (for example, through the Internet using an Internet Service Provider).

Many different embodiments have been disclosed herein, in connection with the above description and the drawings. It will be understood that it would be unduly repetitious and obfuscating to literally describe and illustrate every combination and subcombination of these embodiments. Accordingly, all embodiments can be combined in any way and/or combination, and the present specification, including the drawings, shall be construed to constitute a complete written description of all combinations and subcombinations of the embodiments described herein, and of the manner and process of making and using them, and shall support claims to any such combination or subcombination.

It will be appreciated by persons skilled in the art that the embodiments described herein are not limited to what has been particularly shown and described herein above. In addition, unless mention was made above to the contrary, it should be noted that all of the accompanying drawings are not to scale. A variety of modifications and variations are possible in light of the above teachings without departing from the scope of the following claims.

What is claimed is:

1. A method implemented in a wireless device configured to communicate with a network node, the method comprising:
    receiving:
        a first radio resource control, RRC, configuration profile associated with a cell, the first RRC configuration profile including a plurality of first RRC configuration parameters; and a second RRC configuration profile associated with the cell, the second RRC configuration profile including a plurality of second RRC configuration parameters; and responsive to at least one of:
receiving an RRC profile indicator comprised in a downlink control information, DCI; and
a timer expiring, switching from communicating in the cell according to the first RRC configuration profile to communicating in the cell according to the second RRC configuration profile, the RRC profile indicator directly indicating the second RRC configuration profile;

the first and second RRC configuration profiles are grouped into a first RRC configuration profile group, and each RRC configuration profile in the first RRC configuration profile group shares a set of common RRC configuration parameter values; and the set of common RRC configuration parameter values shared by each RRC configuration profile in the first RRC configuration profile group includes at least one same radio processing chain parameter value, the at least one same radio processing chain parameter value includes at least one of a same bandwidth, a same frequency location, a same numerology, a same subcarrier spacing and a same cyclic prefix length.

2. The method of claim 1, wherein the RRC profile indicator is comprised in at least one field in the DCI, and a value of the RRC profile indicator maps to one of a plurality of pre-configured RRC configuration profiles.

3. The method of claim 1, further comprising:
using a radio processing chain that is tuned to communicate in the cell according to the first RRC configuration profile; and
wherein switching comprises switching from communicating in the cell according to the first RRC configuration profile to communicating in the cell according to the second RRC configuration profile without re-tuning the radio processing chain.

4. The method of claim 1, wherein:
the first RRC configuration profile is grouped into a first RRC configuration profile group with at least one other RRC configuration profile, and the second RRC configuration profile is grouped into a second RRC configuration profile group with at least one other RRC configuration profile;
each RRC configuration profile in the first RRC configuration profile group share a first set of common RRC configuration parameter values; and
each RRC configuration profile in the second RRC configuration profile group share a second set of common RRC configuration parameter values, the first set of common RRC configuration parameter values being different from the second set of common RRC configuration parameter values.

5. The method of claim 4, wherein each of the first and second set of common RRC configuration parameter values includes at least one same radio processing chain parameter value, the at least one same radio processing chain parameter value includes at least one of a same bandwidth, a same frequency location, a same numerology, a same subcarrier spacing and a same cyclic prefix length as each of the at least one other RRC configuration profile in the respective first and second RRC configuration profile group.

6. The method of claim 1, further comprising:
using a radio processing chain that is tuned to communicate in the cell according to the first RRC configuration profile; and
wherein switching comprises:
responsive to the at least one of the receiving the RRC profile indicator comprised in the DCI and the timer expiring:
re-tuning the radio processing chain according to the second RRC configuration profile when the second RRC configuration profile and the first RRC configuration profile belong to different RRC configuration profile groups; and
switching from communicating in the cell according to the first RRC configuration profile to communicating in the cell according to the second RRC configuration profile without re-tuning the radio processing chain when the second RRC configuration profile and the first RRC configuration profile belong to a same RRC configuration profile group.

7. A wireless device configured to communicate with a network node, the wireless device comprising processing circuitry, the processing circuitry configured to cause the wireless device to:
receive:
a first radio resource control, RRC, configuration profile associated with a cell, the first RRC configuration profile including a plurality of first RRC configuration parameters; and
a second RRC configuration profile associated with the cell, the second RRC configuration profile including a plurality of second RRC configuration parameters; and responsive to at least one of:
receiving an RRC profile indicator comprised in a downlink control information, DCI; and
a timer expiring, switch from communicating in the cell according to the first RRC configuration profile to communicating in the cell according to the second RRC configuration profile, the RRC profile indicator directly indicating the second RRC configuration profile;

the first and second RRC configuration profiles are grouped into a first RRC configuration profile group, and each RRC configuration profile in the first RRC configuration profile group share a set of common RRC configuration parameter values; and the set of common RRC configuration parameter values shared by each RRC configuration profile in the first RRC configuration profile group includes at least one same radio processing chain parameter value, the at least one same radio processing chain parameter value includes at least one of a same bandwidth, a same frequency location, a same numerology, a same subcarrier spacing and a same cyclic prefix length.

8. The wireless device of claim 7, wherein the RRC profile indicator is comprised in at least one field in the DCI, and a value of the RRC profile indicator maps to one of a plurality of pre-configured RRC configuration profiles.

9. The wireless device of claim 7, wherein the processing circuitry is further configured to cause the wireless device to:
use a radio processing chain that is tuned to communicate in the cell according to the first RRC configuration profile; and
switch by being configured to cause the wireless device to switch from communicating in the cell according to the first RRC configuration profile to communicating in the cell according to the second RRC configuration profile without re-tuning the radio processing chain.

10. The wireless device of claim 7, wherein:
the first RRC configuration profile is grouped into a first RRC configuration profile group with at least one other RRC configuration profile and the second RRC configuration profile is grouped into a second RRC configuration profile group with at least one other RRC configuration profile;
each RRC configuration profile in the first RRC configuration profile group share a first set of common RRC configuration parameter values; and
each RRC configuration profile in the second RRC configuration profile group share a second set of common RRC configuration parameter values, the first set of common RRC configuration parameter values being different from the second set of common RRC configuration parameter values.

11. The wireless device of claim 10, wherein each of the first and second set of common RRC configuration parameter values includes at least one same radio processing chain parameter value, the at least one same radio processing chain parameter value includes at least one of a same bandwidth, a same frequency location, a same numerology, a same subcarrier spacing and a same cyclic prefix length as each of the at least one other RRC configuration profile in the respective first and second RRC configuration profile group.

12. The wireless device of claim 7, wherein the processing circuitry is further configured to cause the wireless device to:
use a radio processing chain that is tuned to communicate in the cell according to the first RRC configuration profile; and
switch by being configured to cause the wireless device to:
responsive to the at least one of the receiving the RRC profile indicator comprised in the DCI and the timer expiring;
re-tune the radio processing chain according to the second RRC configuration profile when the second RRC configuration profile and the first RRC configuration profile belong to different RRC configuration profile groups; and
switch from communicating in the cell according to the first RRC configuration profile to communicating in the cell according to the second RRC configuration profile without re-tuning the radio processing chain when the second RRC configuration profile and the first RRC configuration profile belong to a same RRC configuration profile group.

13. A network node configured to communicate with a wireless device, the network node comprising processing circuitry, the processing circuitry configured to cause the network node to:
send to the wireless device:
a first radio resource control, RRC, configuration profile associated with a cell, the first RRC configuration profile including a plurality of first RRC configuration parameters; and
a second RRC configuration profile associated with the cell, the second RRC configuration profile including a plurality of second RRC configuration parameters;
optionally, send an RRC profile indicator comprised in a downlink control information, DCI;
as a result of at least one of the RRC profile indicator comprised in the DCI and a timer expiring for the wireless device, switch from communicating in the cell with the wireless device according to the first RRC configuration profile to communicating in the cell with the wireless device according to the second RRC configuration profile, the RRC profile indicator directly indicating the second RRC configuration profile;
the first and second RRC configuration profiles are grouped into a first RRC configuration profile group, and each RRC configuration profile in the first RRC configuration profile group share a set of common RRC configuration parameter values; and
the set of common RRC configuration parameter values shared by each RRC configuration profile in the first RRC configuration profile group includes at least one same radio processing chain parameter value, the at least one same radio processing chain parameter value includes at least one of a same bandwidth, a same frequency location, a same numerology, a same subcarrier spacing and a same cyclic prefix length.

14. The network node of claim 13, wherein the RRC profile indicator is comprised in at least one field in the DCI, and a value of the RRC profile indicator maps to one of a plurality of pre-configured RRC configuration profiles.

* * * * *